(12) United States Patent
Kyou et al.

(10) Patent No.: US 10,432,771 B2
(45) Date of Patent: Oct. 1, 2019

(54) COMMUNICATION DEVICE, COMMUNICATION METHOD, AND STORAGE MEDIUM

(71) Applicant: CASIO COMPUTER CO., LTD., Shibuya-ku, Tokyo (JP)

(72) Inventors: Kazuho Kyou, Hamura (JP); Makoto Nakagawa, Hamura (JP); Hiroshi Iwamiya, Hamura (JP); Toshihiro Takahashi, Hamura (JP); Takahiro Tomida, Hamura (JP); Tsutomu Terazaki, Hamura (JP); Ryo Okumura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 79 days.

(21) Appl. No.: 15/708,369

(22) Filed: Sep. 19, 2017

(65) Prior Publication Data
US 2018/0183919 A1    Jun. 28, 2018

(30) Foreign Application Priority Data
Dec. 27, 2016  (JP) .................. 2016-253430

(51) Int. Cl.
| | | |
|---|---|---|
| *H04B 7/00* | (2006.01) | |
| *H04M 1/725* | (2006.01) | |
| *H04W 56/00* | (2009.01) | |
| *H04W 4/80* | (2018.01) | |
| *H04W 4/21* | (2018.01) | |
| *H04W 4/50* | (2018.01) | |

(52) U.S. Cl.
CPC ........... *H04M 1/7253* (2013.01); *H04W 4/80* (2018.02); *H04W 56/001* (2013.01); *H04M 1/72563* (2013.01); *H04W 4/21* (2018.02); *H04W 4/50* (2018.02)

(58) Field of Classification Search
CPC .... H04M 1/7253; H04W 4/80; H04W 56/001
USPC ...................... 455/41.1, 41.2, 41.3
See application file for complete search history.

(56) References Cited

U.S. PATENT DOCUMENTS

| | | | | |
|---|---|---|---|---|
| 2003/0096627 A1* | 5/2003 | Rasanen | ............... | H04W 28/18 455/466 |
| 2006/0058059 A1* | 3/2006 | Kim | ...................... | H04W 88/06 455/550.1 |
| 2006/0146805 A1* | 7/2006 | Krewson | ........... | H04L 29/06027 370/352 |

(Continued)

FOREIGN PATENT DOCUMENTS

JP     2014-175830     9/2014

*Primary Examiner* — Md K Talukder
(74) *Attorney, Agent, or Firm* — Amin, Turocy & Watson LLP

(57) ABSTRACT

According to an aspect of the present invention, a device capable of wireless communication includes a communicator configured to transmit and receive communication packets to and from other device, a memory configured to store one or more kinds of setting information, and a processor configured to determine whether or not at least one of the one or more kinds of setting information has been changed after the last communication with the other device, generate discrimination information indicating whether or not each of the one or more kinds of setting information has been changed, and control communication with the other device based on the discrimination information.

17 Claims, 21 Drawing Sheets

(56) References Cited

U.S. PATENT DOCUMENTS

| | | | |
|---|---|---|---|
| 2011/0009060 A1* | 1/2011 | Hsu | H04W 52/16 |
| | | | 455/41.2 |
| 2011/0019555 A1* | 1/2011 | Gotoh | H04W 52/0241 |
| | | | 370/252 |
| 2011/0019762 A1* | 1/2011 | Tsubota | H04L 1/0002 |
| | | | 375/295 |
| 2012/0258658 A1* | 10/2012 | Matsuo | H04L 12/2856 |
| | | | 455/3.06 |
| 2013/0237188 A1* | 9/2013 | Shibuya | H04W 12/06 |
| | | | 455/411 |
| 2015/0327001 A1* | 11/2015 | Kirshenberg | H04W 28/18 |
| | | | 455/41.2 |
| 2015/0327005 A1* | 11/2015 | Niwa | H04W 88/06 |
| | | | 455/41.2 |
| 2016/0105924 A1* | 4/2016 | Baek | H04M 1/6066 |
| 2016/0127559 A1* | 5/2016 | Baek | G06F 21/35 |
| | | | 455/417 |
| 2016/0128112 A1* | 5/2016 | Dunsbergen | H04W 76/10 |
| | | | 455/41.2 |
| 2016/0157108 A1* | 6/2016 | Park | H04W 24/02 |
| | | | 370/329 |
| 2017/0154326 A1* | 6/2017 | Jo | H04W 4/04 |
| 2017/0279808 A1* | 9/2017 | Kwon | H04W 8/00 |
| 2018/0183919 A1* | 6/2018 | Kyou | H04W 4/80 |
| 2018/0220335 A1* | 8/2018 | Lee | H04W 52/0229 |
| 2018/0295660 A1* | 10/2018 | Choi | H04W 4/80 |
| 2019/0007833 A1* | 1/2019 | Takahashi | H04W 12/06 |

\* cited by examiner

| 2 Octets | 2 or 16 Octets | variable length | |
|---|---|---|---|
| Attribute Handle | Attribute Type | Attribute Value | Attribute Permission |

FIG. 5

| Attribute PDU Name | Attribute Opcode | Parameters |
|---|---|---|
| Error Response | 0x01 | Request Opcode in Error, Attribute Handle In Error, Error Code |
| Exchange MTU Request | 0x02 | Client Rx MTU |
| Exchange MTU Response | 0x03 | Server Rx MTU |
| Find Information Request | 0x04 | Starting Handle, Ending Handle, UUID |
| Find Information Response | 0x05 | Format, Information Data |
| Find By Type Value Request | 0x06 | Starting Handle, Ending Handle, Attribute Type, Attribute Value |
| Find By Type Value Response | 0x07 | Handles Information List |
| Read By Type Request | 0x08 | Starting Handle, Ending Handle, UUID |
| Read By Type Response | 0x09 | Length, Attribute Data List |
| Read Request | 0x0A | Attribute Handle |
| Read Response | 0x0B | Attribute Value |
| Read Blob Request | 0x0C | Attribute Handle, Value Offset |
| Read Blob Response | 0x0D | Part Attribute Value |
| Read Multiple Request | 0x0E | Handle Set |
| Read Multiple Response | 0x0F | Value Set |
| Read by Group Type Request | 0x10 | Start Handle, Ending Handle, UUID |
| Read by Group Type Response | 0x11 | Length, Attribute Data List |
| Write Request | 0x12 | Attribute Handle, Attribute Value |
| Write Response | 0x13 | — |
| Write Command | 0x52 | Attribute Handle, Attribute Value |
| Prepare Write Request | 0x16 | Attribute Handle, Value Offset, Part Attribute Value |
| Prepare Write Response | 0x17 | Attribute Handle, Value Offset, Part Attribute Value |
| Execute Write Request | 0x18 | Flags |
| Execute Write Response | 0x19 | - |
| Handle Value Notification | 0x1B | Attribute Handle, Attribute Value |
| Handle Value Indication | 0x1D | Attribute Handle, Attribute Value |
| Handle Value Confirmation | 0x1E | |
| Signed Write Command | 0xD2 | Attribute Handle, Attribute Value, Authentication Signature |

FIG. 7

| Handle | Attribute Type | Attribute Value |
|---|---|---|
| 0x0039 | <<Primary Service>> | <<Watch Service>> |
| 0x003a | <<Characteristics>> | 0x0a,0x003b,<<ServiceN1>> |
| 0x003b | <<ServiceN1>> | (ServiceN1 value) |
| 0x003c | <<Characteristics>> | 0x0a,0x003d,<<ServiceN2>> |
| 0x003d | <<ServiceN2>> | (ServiceN2 value) |
| ... | ... | ... |
| 0x0052 | <<Characteristics>> | 0x0a,0x0053,<<ServiceNx>> |
| 0x0053 | <<ServiceNx>> | (ServiceNx value) |

FIG. 8

| Handle | Attribute Type | Attribute Value |
|---|---|---|
| 0x0039 | <<Primary Service>> | <<Watch Service>> |
| 0x003a | <<Characteristics>> | 0x0a,0x003b,<<ServiceN1>> |
| 0x003b | <<ServiceN1>> | (ServiceN1 value) |
| 0x003c | <<Characteristics>> | 0x0a,0x003d,<<ServiceN2>> |
| 0x003d | <<ServiceN2>> | (ServiceN2 value) |
| ... | ... | ... |
| 0x0052 | <<Characteristics>> | 0x0a,0x0053,<<ServiceNx>> |
| 0x0053 | <<ServiceNx>> | (ServiceNx value) |
| 0x0054 | <<Characteristics>> | 0x0a,0x0055,<<My Acc Ctrl>> |
| 0x0055 | <<My Acc Ctrl>> | (Access Control Bitmap) |

FIG. 12

| Handle | Attribute Type | Attribute Value |
|---|---|---|
| 0x000d | <<Primary Service>> | <<Watch Service>> |
| 0x000e | <<Characteristics>> | 0x0a,0x000f,<<My Acc Ctrl>> |
| 0x000f | <<My Acc Ctrl>> | (Access Control Bitmap) |
| 0x0010 | <<Characteristics>> | 0x0a,0x0011,<<All Features>> |
| 0x0011 | <<All Features>> | (Service values) |

COMMUNICATION DEVICE, COMMUNICATION METHOD, AND STORAGE MEDIUM

CROSS-REFERENCE TO RELATED APPLICATIONS

This application is based upon and claims the benefit of priority under 35 USC 119 of Japanese Patent Application No. 2016-253430 filed on Dec. 27, 2016, the entire disclosure of which is incorporated herein by reference in its entirety for all purposes.

BACKGROUND OF THE INVENTION

1. Field of the Invention

The present invention relates to a communication device, a communication method, and a computer readable storage medium for storing a program for executing the communication method therein.

2. Description of the Related Art

Conventionally, there exist electronic devices capable of exchanging various kinds of information with other devices using a short-distance wireless communication protocol such as Bluetooth (Registered Trademark). Bluetooth is a communication standard for connecting various devices and exchanging data between the devices wirelessly over short distances. There are two forms of Bluetooth communication technologies: BR/EDR (Basic Rate/Enhanced Data Rate) and LE (Low Energy). Bluetooth BR/EDR is also referred to as Bluetooth Classic. Bluetooth Low Energy (hereinafter, referred to as "BLE") adopted in Bluetooth 4.0 and later versions is a technology enabling several hundreds of kilobytes (KBs) of information to be stably communicated with low power consumption. The BLE technology reduces energy consumption by simplifying operations compared to Bluetooth Classic. Most wearable wireless communication devices such as smart bands, smart watches, smart glasses, etc., which have been recently launched, perform wireless communication using the BLE technology.

By such short-range wireless communication technologies, an electronic device can easily acquire information acquired and held by a different electronic device. For example, Japanese Patent Application Laid-Open Publication No. 2014-175830 published on Sep. 22, 2014, discloses that two communication devices exchange MTU (Maximum Transmission Unit) values and one of the devices allocates a communication period according to the exchanged MTU values to enable efficient communication.

The technology disclosed in the above patent document does not consider kinds of information to be transmitted and received. Thus, in the case that a plurality of kinds of information should be communicated between two communication devices, the number of communication between the devices increases according to the number of kinds of information to be communicated. By this, if the number of kinds of information to be communicated is large, the current consumption and processing load of the communication devices increase.

An object of the present invention is to provide a method for improving efficiency of communication between wireless communication devices, a communication device for executing the method, and a computer readable storage medium for storing a program capable of executing the method therein.

SUMMARY OF THE INVENTION

According to one aspect of the invention, a device capable of wireless communication includes a communicator configured to transmit and receive communication packets to and from other device, a memory configured to store one or more kinds of setting information, and a processor configured to determine whether or not at least one of the one or more kinds of setting information has been changed after the last communication with the other device, generate discrimination information indicating whether or not each of the one or more kinds of setting information has been changed, and control communication with the other device based on the discrimination information.

According to another aspect of the invention, a device capable of wireless communication includes a communicator configured to receive service information from other device, and transmit and receive communication packets to and from the other device, a memory configured to store one or more kinds of setting information, and a processor configured to receive discrimination information indicating whether or not each of the one or more kinds of setting information is to be updated from the other device, and control communication with the other device based on the discrimination information.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are intended exclusively for explanation and do not limit the scope of the present invention. Here:

FIG. 5 shows an example of a typical structure of an Attribute stored in a GATT server.

FIG. 7 is a table showing an example of a list of Attribute Opcodes and parameters of Attribute protocol PDUs.

FIG. 8 shows an example of a conventional attribute database.

FIG. 12 shows an example of an attribute database according to an embodiment of the present invention.

DETAILED DESCRIPTION OF THE PREFERRED EMBODIMENT

In the present specification, the invention will be mainly described in connection with embodiments in which it has been applied to Bluetooth, in particular BLE, but its application field is not limited to Bluetooth. For example, the invention can be applied to various communication systems using service discovery.

Hereinafter, embodiments of the present invention will be described with reference to the accompanying drawings. The scope of the invention is not intended to be limited to the illustrated examples.

Figure 1:
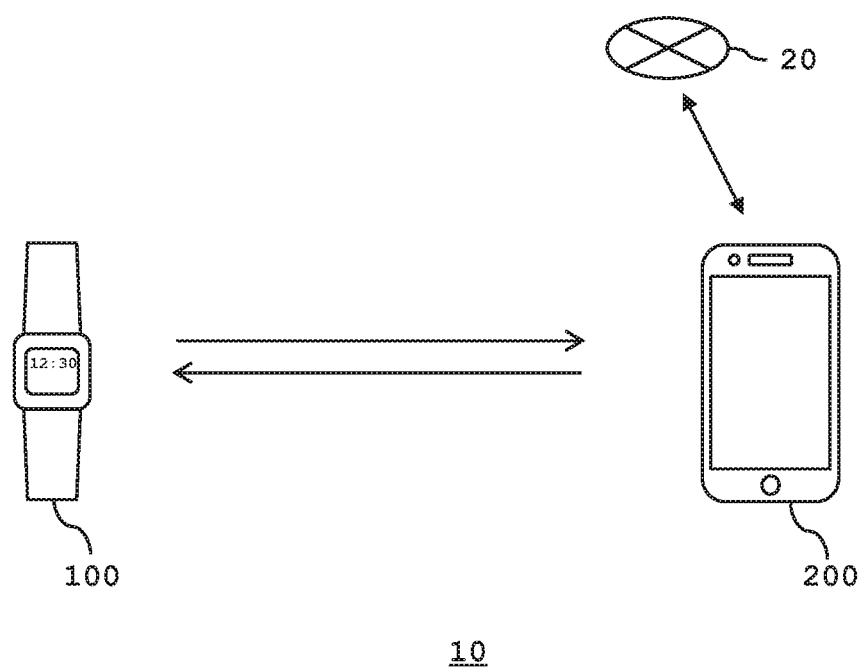
FIG. 1 shows an example of a wireless communication system to which methods proposed in this disclosure are applicable.

FIG. 1 is common to all of the embodiments in the following and shows an example of a wireless communication system to which methods proposed in this disclosure are applicable. In the embodiments described below, a first device and a second device perform short-distance wireless communication using the BLE technology. A wireless communication system 10 includes at least a first device 100 and a second device 200 capable of being wirelessly connected to and exchanging data with the first device 100 via BLE. For example, the first device 100 to which the present invention is applicable is an electronic timepiece which is a kind of a watch type terminal. However, the first device 100 is not limited to this example and any type or any kind of device capable of BLE communication can be the first device 100. For example, the first device 100 may be a digital camera, a healthcare appliance such as a digital body weight scale, or a wearable device such as a smart band.

The second device 200 to which the present invention is applicable is, for example, a smart phone which is a kind of a mobile phone and is connected to a mobile communication network 20. However, the second device 200 is not limited to this example and any type or any kind of device capable of short distance wireless communication can be the second device 200.

As will be described in detail in the following, the ATT (Attribute Protocol) of BLE defines rules for one device to access data of the other device in a server-client structure. A server provides a service and a client can acquire information relating to the service provided by the server (hereinafter, also referred to as "service information") by sending a request to the server. Hereinafter, for convenience of explanation, the first device 100 is regarded as the server and an application of the second device 200 is regarded as the client, unless otherwise specified. However, the first device 100 may operate as the client in relation to other device(s) and the second device 200 may operate as the server in relation to other device(s). In a BLE communication system, one device belonging to the system may operate as the server or the client or as the client and server at the same time if necessary.

The second device 200 can request to the first device 100 for data. In the case that the first device 100 receives a Request message for requesting data from the second device 200, the first device 100 provides the second device 200 with the requested data by a Response message. Further, the first device 100 transmits a Notification message or an Indication message to notify data to the second device 200. In the case that the first device 100 transmits the Indication message to the second device 200 and the Indication message is successfully received by the second device 200, the second device 200 transmits a Confirmation message to the first device 100 in response to the Indication message. In addition, the second device 200 transmits a Request message or a Command message to the first device 100 to request to the first device 100 for writing of data. In the case that the second device 200 transmits the Request message to the first device 100 and the data is successfully written by the first device 100, the first device 100 transmits a Response message to the second device 200.

The first device 100 or the second device 200 can provide a user with information data via an output unit (for example, a display unit) or receive a request of the user input via an input unit (for example, a user input interface) during communicating a message with the other device. Further, the first device 100 or the second device 200 can read data from a memory or write new data to the memory.

Figure 2A:
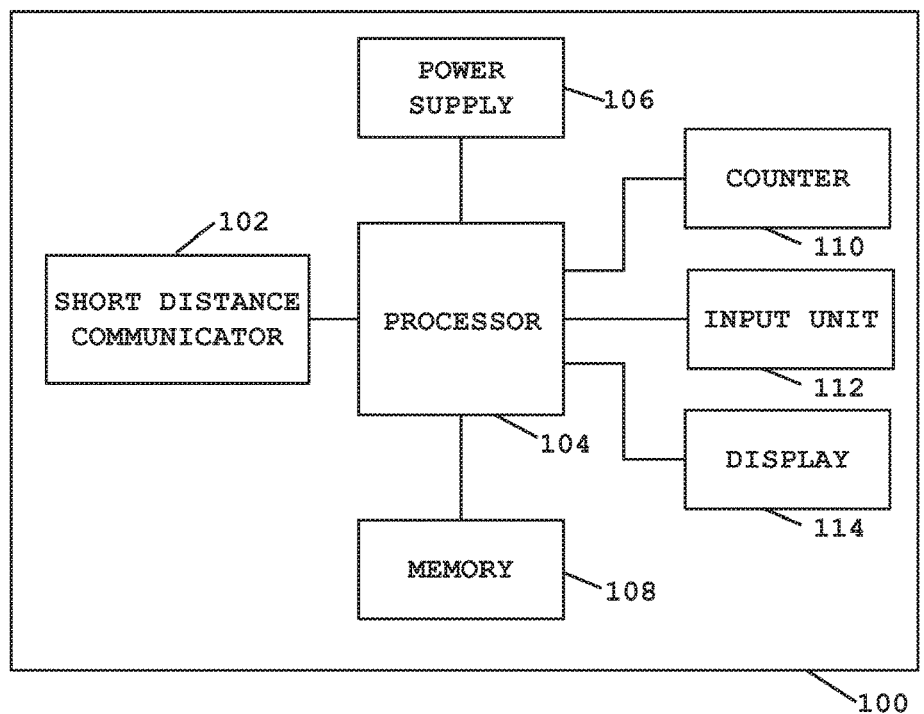
FIG. 2A is an internal block diagram illustrating an exemplary device capable of implementing the methods proposed in this disclosure.
Figure 2B:
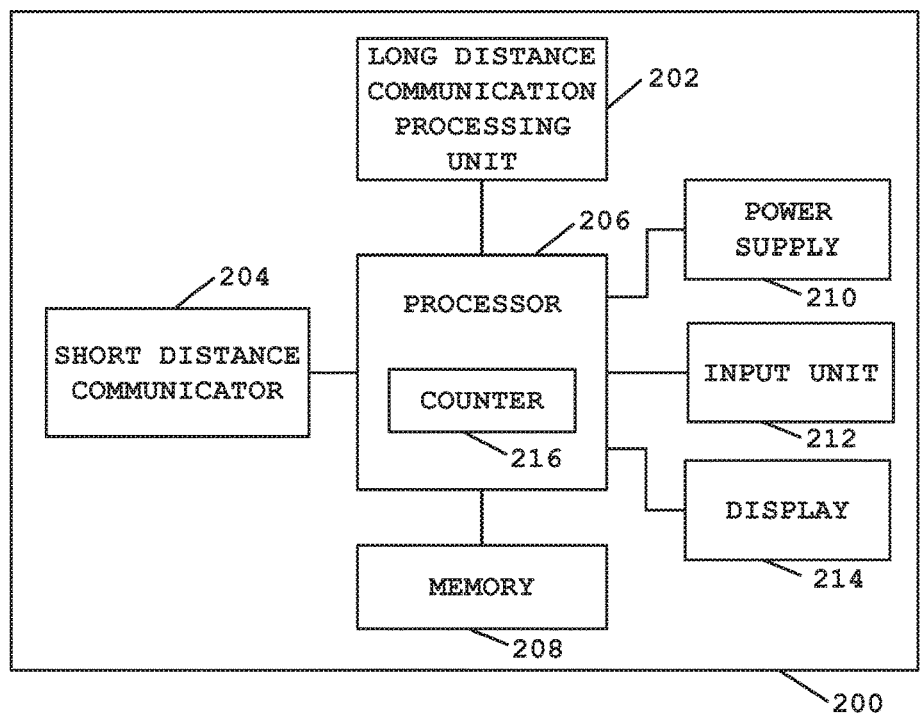
FIG. 2B is an internal block diagram illustrating an exemplary device capable of implementing the methods proposed in this disclosure.

Each of FIGS. 2A and 2B is an internal block diagram illustrating an exemplary device capable of implementing the methods proposed in this disclosure. FIG. 2A is an internal block diagram of the first device 100 and FIG. 2B is an internal block diagram of the second device 200.

As shown in FIG. 2A, the first device 100 includes a short distance communicator 102, a processor 104, a power supply 106, a memory 108, a counter 110, an input unit 112, and a display 114. The short distance communicator 102 includes an interface enabling transmission/reception of the Request/Response, Command, Notification, Indication/Confirmation messages or data between the devices using the short-distance wireless communication technology (for example, Bluetooth) and a baseband circuit for processing wireless signals. In the present embodiment, the short distance communicator 102 supports BLE. At least one of functions of the short distance communicator 102 can be implemented by software. In this case, the software implementing the at least one function can be stored in the memory 108 in the form of a program executing the at least one function.

The processor 104 controls operations of the first device 100 and may also be referred to as a control unit or a controller. The processor 104 may include an ASIC (application-specific integrated circuit), different chipsets, a logic circuit and/or a data processing unit. The power supply 106 includes a battery and a power management unit (not shown in the drawing). The memory 108 is used to store computer program instructions executed by the processor 104, software such as firmware, data required by the processor 104, and/or data resulted from processing by the processor 104. The memory 108 includes one or more storage devices selected from a group including a RAM (Random Access Memory), a ROM (Read Only Memory), a flash memory, and a disk drive integrated into or removable from the first device 100. Alternatively, the memory 108 may be integrated into the processor 104.

The counter 110 includes a clock circuit for generating time signals, for example, from signals generated by a system clock or an oscillator (not shown in the drawing). The counter 110 generates time information by counting current time and outputs the generated time information to the processor 104. The counter 110 may be integrated into the processor 104. The input unit 112 includes one or more keys, one or more switches, and/or a touch panel (not shown in the drawing). Various kinds of data are input according to manipulations of the input unit 112 by the user. The display 114 includes a display device such as an LCD or an OLED and a driving circuit (not shown in the drawing) and displays information such as the current time.

The first device 100 normally displays the current time, which is being counted by the counter 110, using the display 114. In the case that the first device 100 receives data indicating current time from the second device 200 via the short distance communicator 102, time of the first device 100 is synchronized with that of the second device 200 by setting the counter 110 to the time indicated by the received data.

As shown in FIG. 2B, the second device 200 includes a long distance communication processing unit 202, a short distance communicator 204, a processor 206, a memory 208, a power supply 210, an input unit 212, and a display 214. The processor 206 includes a counter 216. The long distance communication processing unit 202 allows the second device 200 serve as a mobile phone by communicating with a base station of a cellular network system such as 3G or LTE. The long distance communication processing unit 202 includes an amplifier for amplifying signals received or transmitted via an antenna, a transceiver, a digital baseband processor, a voice input circuit, or a playback circuit, but descriptions and drawings of these components are omitted because they are well-known. The counter 216 can hold accurate time information by acquiring accurate time data via the long distance communication processing unit 202 from the mobile communication network 20. As described above, the second device 200 can transfer the time information held by the counter 216 to the first device 100.

The short distance communicator 204 includes an interface enabling transmission/reception of the Request/Response, Command, Notification, Indication/Confirmation messages or data between the devices using the short-distance wireless communication technology (for example, Bluetooth) and a baseband circuit for processing radio signals. In the present embodiment, the short distance communicator 204 supports BLE. At least one of functions of the short distance communicator 204 can be implemented by software. In this case, the software implementing the at least one function can be stored in the memory 208 in the form of a program executing the at least one function.

The processor 206 controls operations of the second device 200 and is an application processor, for example. While the processor 206 includes the counter 216 in the present embodiment, the counter 216 may be a separate element in different embodiments. The memory 208 is used to store computer program instructions executed by the processor 206, software such as firmware, data required by the processor 206, and/or data resulted from processing by the processor 206. The memory 208 includes one or more storage devices selected from a group including a RAM (Random Access Memory), a ROM (Read Only Memory), a flash memory, and a disk drive integrated into or removable from the second device 200. Alternatively, the memory 208 may be integrated into the processor 206.

The power supply 210 includes a battery and a power management unit (not shown in the drawing). The input unit 212 includes one or more keys, one or more switches, and/or a touch panel (not shown in the drawing). Various kinds of data are input according to manipulations of the input unit 212 by the user. The display 214 includes a display device such as an LCD or an OLED and a driving circuit (not shown in the drawing).

The system shown in FIG. 1, and the devices shown in FIGS. 2A and 2B, respectively, are merely examples and do not limit the scope of systems or devices capable of implementing the methods described herein.

Figure 3:
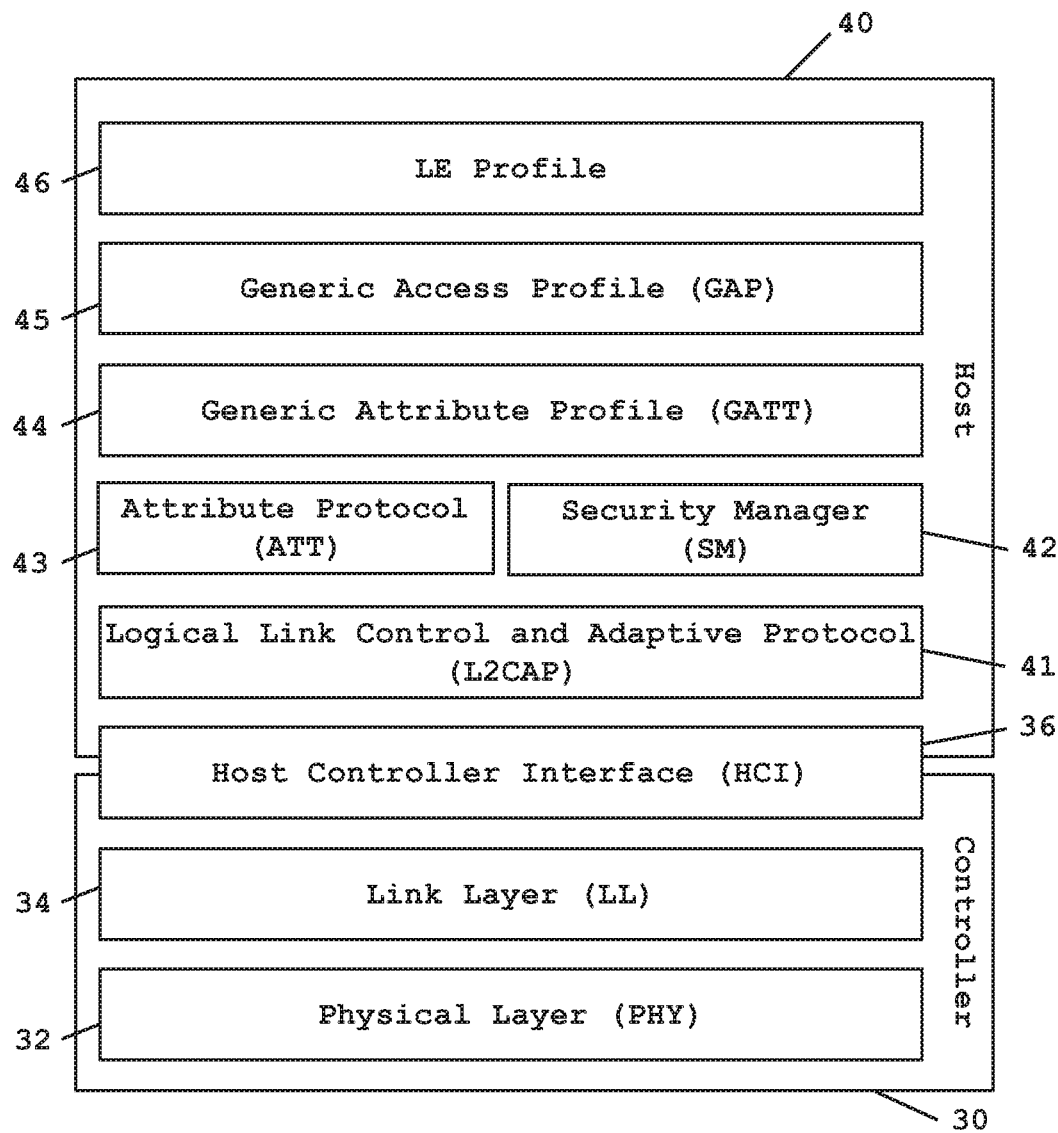
FIG. 3 shows an example of a BLE communication architecture to which the methods proposed in this disclosure are applicable.

FIG. 3 shows an example of a BLE communication architecture to which the methods proposed in this disclosure are applicable. For example, a BLE protocol stack includes a Controller stack 30 operable to control a timing critical radio interface and a host stack 40 operable to deal with high level data. The Controller stack 30 may be implemented by using a communication module and a processor module which may include a processing device such as a microprocessor. The Host stack 40 may be implemented as a part of an operating system (OS) running on the processor module or instantiation of a package above the OS.

The Controller stack 30 includes a physical layer (PHY) 32, a link layer 34, and a Host Controller Interface (HCI) 36. The physical layer (or a wireless transceiver module) 32 is a layer for transmission and reception of wireless signals of 2.4 GHz and uses Gaussian Frequency Shift Keying (GFSK) modulation and a frequency hopping scheme using 40 RF channels. The link layer 34 is responsible for transmission and reception of Bluetooth packets and provides capabilities of creating a connection between devices after advertising and scanning using 3 advertising channels and transmitting and receiving data packets of up to 42 bytes over 37 data channels. The HCI 36 provides an interface between the Host stack and the Controller stack such that the Host stack can provide the Controller stack with commands and data and the Controller stack can provide the Host stack with events and data.

The Host stack 40 includes a Logical Link Control and Adaptation Layer Protocol (L2CAP) 41, a Security Manager (SM) 42, an Attribute Protocol (ATT) 43, a Generic Attribute Profile (GATT) 44, a Generic Access Profile 45, and an LE profile 46. The Host stack 40 is not limited to this example and may include various protocols and profiles. The Host stack 40 multiplexes various protocols and profiles provided by the Bluetooth specification using the L2CAP.

The L2CAP 41 may provide one bidirectional channel for transferring data according to a specific protocol or profile. The Security Manager 42 is a protocol for authenticating a device and providing key distribution.

The ATT protocol 43 defines rules for one device to access data of the other device in the server-client structure. The ATT protocol defines six (6) types of messages (Request, Response, Command, Notification, Indication, and Confirmation), as follows:

(1) Request and Response messages: The Request message is transmitted to the server by the client to request specific information. The Response message is transmitted from the server to the client to reply to the Request message.

(2) Command message: The command message is transmitted to the server by the client to request the server to take a specific action. The server sends no response to the Command message to the client.

(3) Notification message: The Notification message is transmitted to the client by the server to notify the client of an event or the like. The client sends no confirmation in response to the Notification message to the server.

(4) Indication and Confirmation messages: The indication message is transmitted to the client by the server to notify the client of an event or the like. Unlike the Notification message, the client sends the Confirmation message to the server in response to the Indication message.

The GATT profile 44 is operable as a protocol for describing how the ATT protocol 43 is used at the time of configuring a service. The GATT profile 44 provides another device with specific data (i.e. attribute) using the concept of Service and Characteristic. The GATT profile 44 defines two roles, i.e. a server which provides an attribute and a client to the attribute is provided.

A service is any entity that can provide information, perform an action, or control a resource on behalf of another entity. The service may be implemented as software, hardware, or a combination of hardware and software. All of the information about the service that is maintained by an SDP server is contained within a single service record. Services are used to break data up into logic entities, and contain specific chunks of data called characteristics. Each service can have one or more characteristics, and distinguishes itself from other services by means of a unique ID called a UUID (Universal Unique Identifier).

A characteristic is a data array used in the service and each characteristic has its UUID. Each characteristic contains two attributes: a characteristic declaration and a Characteristic Value declaration. The characteristic declaration is an attribute with Attribute Type and Attribute Value, and the Attribute Value contains Characteristic Properties, Characteristic Value Handle, and Characteristic UUID. The Characteristic Value declaration contains UUID for Characteristic Value and the Characteristic Value.

The GAP 45 is used to select a role for communication among BLE devices and control procedures of multi-profile operations. The GAP is primarily used for device discovery, connection creation, and security.

The LE profile 46 has dependency on the GATT profile and is mainly applied to BLE devices. For example, the LE profile includes Battery, Time, FindMe, Proximity, and the like.

Figure 4:
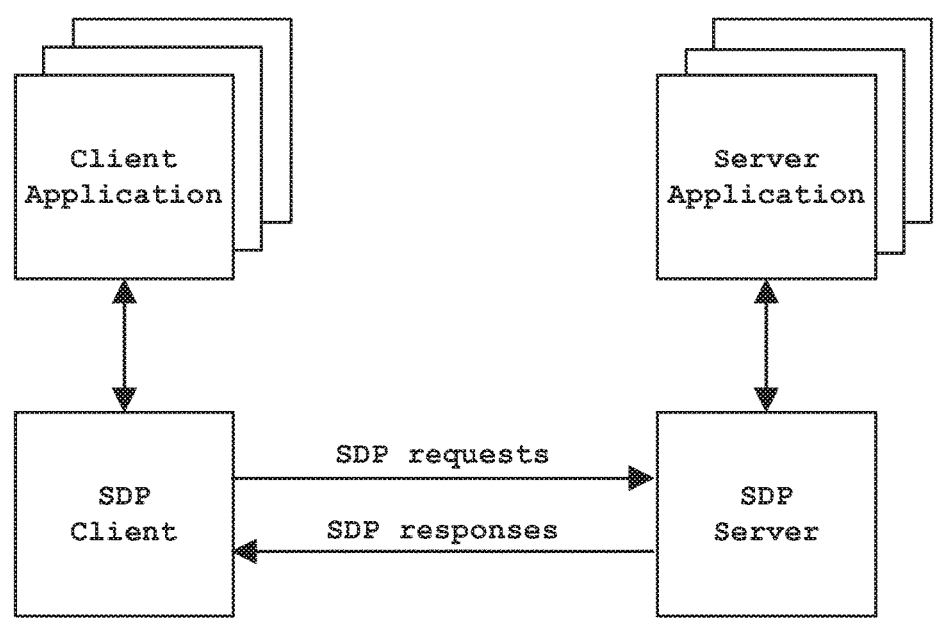
FIG. 4 shows a typical service discovery mechanism.

FIG. 4 shows a typical Bluetooth service discovery mechanism. The service discovery mechanism provides means for client applications to discover the existence of services provided by server applications as well as the attributes of those services. The attributes of a service include the type or class of the service offered and a mechanism or protocol information needed to utilize the service. A Service Discovery Protocol (SDP) involves communication between an SDP server and an SDP client. The server maintains a list of service records that describe the characteristics of services associated with the server. Each service record contains information about a single service. The client can retrieve information from a service record maintained by the SDP server by issuing an SDP request.

If the client, or an application associated with the client, decides to use a service, it opens a separate connection to the service provider in order to utilize the service. SDP provides a mechanism for discovering services and their attributes (including associated service access protocols). The SDP uses UUIDs in order to distinguish between services. If the SDP client knows the UUID of a service to find, it uses the UUID to inquire of the server about whether the server provides the service. If the SDP client does not know the UUID of a service to find, it asks the server for information about services provided by the server. If multiple applications on a device provide services, an SDP server can act on behalf of those service providers to handle requests for information about the services that they provide. Similarly, multiple client applications can utilize an SDP client to query servers on behalf of the client applications.

In the typical Bluetooth service discovery mechanism, service discovery commands are standardized as the BLE protocol, but search methods and search order differ according to operating systems (OSs). For example, iOS (Registered Trademark) searches characteristics after searching all of primary services, while Android (Registered Trademark) searches characteristics every time a primary service is found. The service discovery process is a time consuming process and can lead to undesirable delay when multiple devices are in close proximity to each other.

FIG. 5 shows an example of a typical structure of an Attribute stored in a GATT server. The server uses such attributes to provide services. Each attribute contains four elements and each element has the following meaning:

Attribute Handle: An identifier (or an index) corresponding to a specific attribute.

Attribute Type: A type of an attribute (a UUID describing an attribute value).

Attribute Value: A value of an attribute (data indexed by the handle).

Attribute Permission: Permission associated with an attribute specifying that it may be read and/or written.

Figures 6A, 6B:
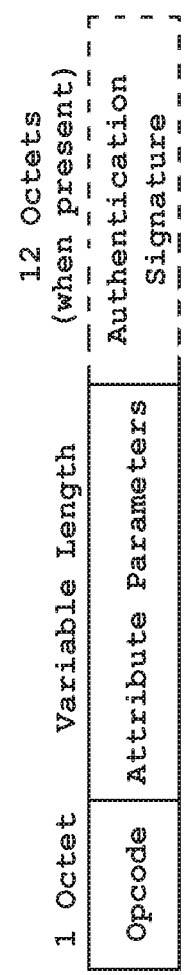
FIG. 6A shows a packet structure defined by the BLE protocol.
FIG. 6B shows an example of a structure of an Attribute protocol PDU which can be used to communicate an attribute value.

FIG. 6A shows a general packet structure defined by the BLE protocol. The Link Layer has only one packet format used for both advertising channel packets and data channel packets. Each packet consists of four fields: a preamble, an Access Address, a PDU header, a PDU payload, and a CRC field. All packets include a PDU header and the PDU header determines the type of advertisement broadcast or logical link. When a packet is transmitted in an advertising physical channel, the PDU shall be an Advertising Channel PDU. When a packet is transmitted in a data physical channel, the PDU shall be a Data Channel PDU. Advertising Channel PDUs are classified into advertising PDUs, scanning PDUs, and Initiating PDUs. The Data Channel PDU has a 16 bit header, a variable size payload, and may include a Message Integrity Check (MIC) field.

FIG. 6B shows an example of a structure of an Attribute protocol PDU which can be used to communicate an attribute value. As shown in FIG. 6B, the Attribute protocol PDU may include an Attribute Opcode field, an Attribute Parameters field, and an Authentication Signature field (optional). The Authentication Signature field is an optional field and selectively exists or does not exist.

The Attribute Opcode is data of one (1) octet and includes information indicating what kind of PDU the Attribute protocol PDU is. FIG. 7 is a table showing an example of a list of Attribute Opcodes and parameters of Attribute protocol PDUs. The Attribute parameters include information to be transferred in an actual message and may have the following values:

Handle: Reference information corresponding to data (or an index). By using the handle, a GATT client may refer to, access, or change a value.
Value: A value of data.
Data List: A list of multiple values of data.
Length: A length of data.

By using the Attribute protocol PDU as described above, the client can read an attribute handle value, an attribute value, a data list, or a length value stored in the server, or can store the value in the server.

FIG. 8 shows an example of a conventional attribute database. A BLE device in which the attribute database shown in FIG. 8 is implemented is, for example, an electronic timepiece. Each service is used to logically break up data and includes one or more characteristics. As shown, Watch Service, which is a primary service, includes a plurality of characteristics (ServiceN1, ServiceN2, . . . , ServiceNx). In this example, the service Watch Service includes x characteristics. In a conventional BLE device, an attribute database is configured so as to have one characteristic for one function (hereinafter, also referred to as a feature), as shown in FIG. 8. Each service has a UUID, that is, a 16-bit or 128-bit identifier. Each characteristic has a UUID, that is, a 16-bit or 128-bit identifier. The Bluetooth standard group provides a list of public service and characteristic UUIDs as the Bluetooth Specification. In the case that the user defines a new custom service/characteristic, the user can generate a new UUID for the new custom service/characteristic by accessing the official website of the International Telecommunication Union (ITU).

Each characteristic contains two attributes, i.e. the characteristic declaration and the Characteristic Value declaration. For example, the characteristic declaration of ServiceN1 consists of Attribute Type (a UUID of Characteristics, specifically, 0x2803) and Attribute Value which contains Characteristic Properties (0x0a), Characteristic Value Handle (0x003b), and Characteristic UUID (a UUID of ServiceN1). The Characteristic Value declaration of ServiceN1 contains a UUID for Characteristic Value (the UUID of ServiceN1) and the Characteristic Value (a value of ServiceN1).

Figure 9:
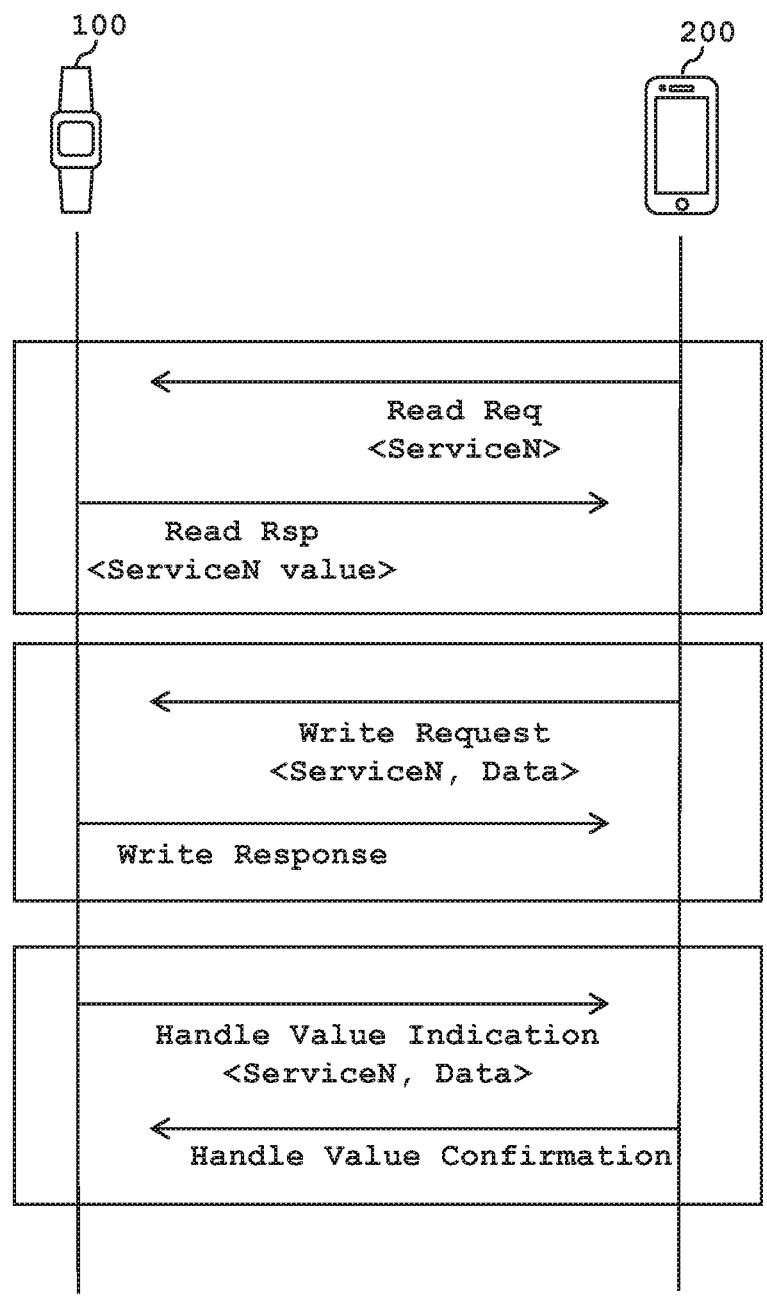
FIG. 9 is a schematic diagram illustrating a conventional method of data communication between a server and a client.

After a connection between the client and the server is established, the two devices can communicate data and the client can access a particular service provided by the server. For example, FIG. 9 illustrates a conventional method of data communication between the server and the client. In this example, the first device 100 operates as the server and the second device 200 operates as the client. In the first device 100, the attribute database of FIG. 8 is implemented. In the case that the client attempts to request to the server for a specific Characteristic Value, the client transmits a Read Request message to the server. The Read Request message is used to request the server to read the value of an attribute and return its value, as defined in the BLE Specification. As shown in FIG. 7, the Read Request message uses the Attribute Handle as its parameter. In this case, the Attribute Handle parameter of the Read Request message is set to a Characteristic Value Handle. In the case that the Read Request from the client is valid, i.e. the client has the authority to request the data and the data can be read, the server transmits the data requested by the client by a Read Response message. The Read Response message is sent by the server in reply to a received Read Request message and contains the value of the attribute that has been read, as defined in the BLE Specification. As shown in FIG. 7, the Read Response message uses the Attribute Value as its parameter. In this case, the value transferred by the Read Response is a Characteristic Value corresponding to the Characteristic Value Handle. For example, in the case that the client requests the value of ServiceN1, the client transmits the Read Request message with the Attribute Handle parameter set to 0x003b to the server and, in reply to the Read Request, the server transmits the Read Response message with the Attribute Value parameter set to (ServiceN1 value) to the client.

In the case that the client attempts to write data to the server, the client transmits a Write Request message with an Attribute Handle parameter and an Attribute Value parameter set to the handle of the Characteristic Value to be written and data to be written to the Characteristic Value, respectively, to the server. The Write Request message is used to request the server to write the value of an attribute, as defined in the BLE Specification. In the case that the request for writing is valid, the server accesses the value of a specific characteristic corresponding to the handle to write the data to the Characteristic value. A Write Response message is transmitted by the server in the case the write of the data succeeds. In the case that the write of the data fails, the server transmits an error message to the client. On the other hand, the client may use a Write Command message which is not accompanied by a response message to request to write data. In this case, the client cannot immediately determine whether or not the write has succeeded. However, since the server does not consume power for transmitting a response message, it is more advantageous to use a Write Command in terms of reducing power consumption in the case the server is a device with a small battery capacity (for example, a wearable device of a watch type).

In the case that the server attempts to notify the client of data, the server transmits a Handle Value Indication message with an Attribute Handle parameter and an Attribute Value parameter set to the handle of a Characteristic Value, which is the data to be notified, and the data, respectively, to the client. The Handle Value Indication message is sent by the server to indicate an attribute's value, as defined in the BLE Specification. In the case that the client has received the Handle Value Indication message successfully, the client sends a Handle Value Confirmation message to the server in response to the received Handle Value Indication. Thus, in the case that the importance of data to be transferred is high, it is preferable to use the Indication message. On the other hand, in the case that the importance of data to be transferred is low and it is important to reduce the power consumption of the client, the server may use a Handle Value Notification message. The Handle Value Notification message is sent by the server to notify an attribute's value like the Handle Value Indication message, but is not accompanied by a Confirmation message, which is a response by the client.

The client requests to the server for data, requests the server to write data, or receives data from the server when necessary, for example, at a predetermined time or when the user performs a predetermined manipulation. Conventionally, even in the case that there is no change in the setting of the server (i.e. values of ServiceN1 to ServiceNx) after the last communication, because power is wasted for sending and receiving the same data repeatedly because communication occurs at predetermined timing. Many embodiments of the present invention are configured to transmit discrimination information indicating whether or not the setting of the server has been changed after the last communication and synchronize only parts of the setting which have been changed between the server and the client. By this configuration, it is possible to reduce the number of communication and/or the amount of data communicated between the server and the client. According to some embodiments of the present invention, a bitmap indicating which part(s) of the setting have been changed after the last communication is adopted. In the following, specific embodiments of the present invention are described.

Figure 10:
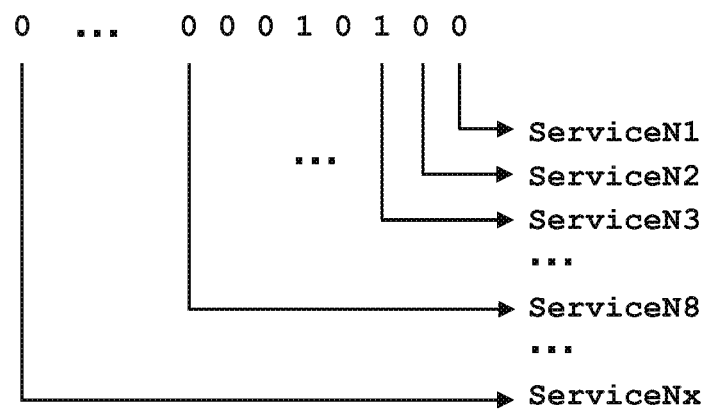
FIG. 10 shows an example of a bitmap used as discrimination information indicating change(s) in setting according to some embodiments of the present invention.

FIG. 10 shows an example of the bitmap used as the discrimination information indicating change(s) in the setting according to some embodiments of the present invention. Bits of the bitmap correspond to features (in the conventional attribute database shown in FIG. 8, characteristics ServiceN1 to ServiceNx) and the value of each bit indicates whether or not the value of a feature corresponding to the bit has been changed. If the value of the bit is zero (0), it indicates that there is no change in the value of the feature corresponding to the bit. If the value of the bit is one (1), it indicates that there is a change in the value of the feature corresponding to the bit. In this example, the service contains x features, i.e. ServiceN1 to ServiceNx, and the values of ServiceN3 and ServiceN5 among the features have been changed. Preferably, corresponding bits of bitmaps in the server and the client are arranged in a common order. Thus, the client can check change(s) in the setting of the server by receiving the bitmap transmitted from the server.

Figure 11:
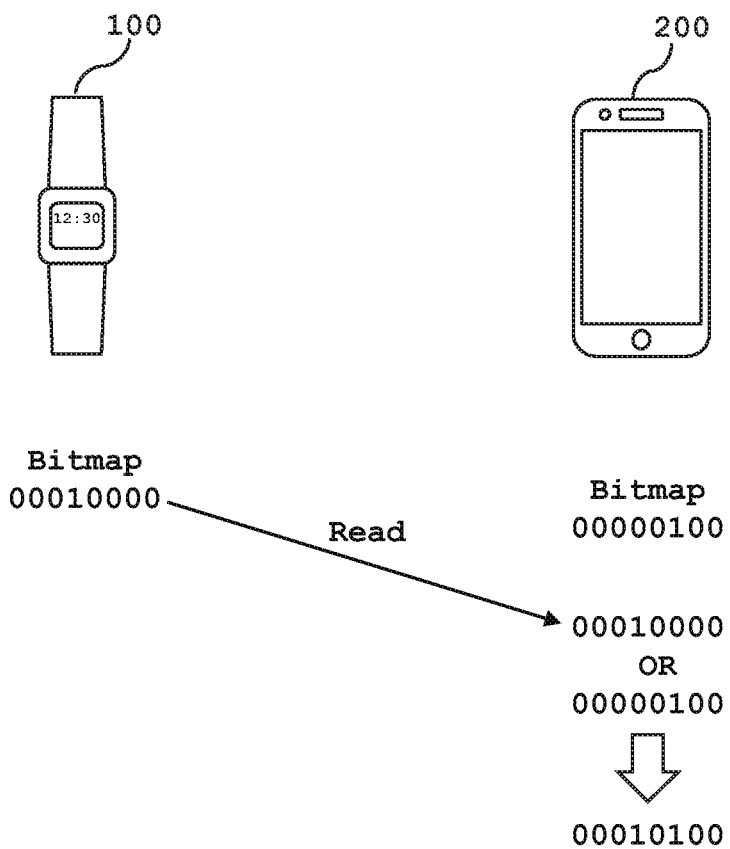
FIG. 11 is a schematic diagram illustrating a method for synchronizing setting of a server and a client by using bitmaps.

FIG. 11 is a schematic diagram illustrating a method for synchronizing setting of the server and the client by using bitmaps as shown in FIG. 10. In this example, the first device 100 operates as the server, and the second device 200 operates as the client. The service of the server contains 8 features. Thus, bitmaps of 8 bits are used. Since the bitmap of the first device 100 is 00010000, the value of the feature ServiceN5 has been changed in the server. Hereinafter, the bitmap in the server is referred to as a setting change bitmap. On the other hand, the second device 200 which is the client wants to change the value of Service N3, thus holding the bitmap of 00000100. The client requests the server to read the bitmap in the server to acquire the setting change bitmap from the server. The client can acquire an 8 bits value of 00010100 by performing a logical OR of the acquired setting change bitmap 00010000 and the bitmap 00000100 in the client. By this, the client can determine that only ServiceN3 and ServiceN5 need to be synchronized.

FIG. 12 shows an example of an attribute database according to an embodiment of the present invention. Compared to the conventional attribute database shown in FIG. 8, the attribute database of FIG. 12 further includes a characteristic My Acc Ctrl for access control. The setting change bitmap is stored as Access Control Bitmap which is the value of the characteristic. Thus, the client can read the setting change bitmap which is an attribute's value by using the attribute handle (0x0055) when necessary.

Figure 13:
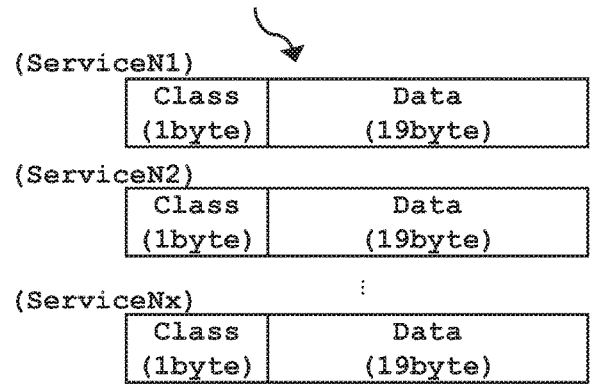
FIG. 13 shows an example of an attribute database according to another embodiment of the present invention.

FIG. 13 shows an example of an attribute database according to another embodiment of the present invention. The conventional attribute database shown in FIG. 8 contains x characteristics corresponding to x features of Watch Service and the value of each characteristic is stored as an attributes value. The attribute database according to the present embodiment contains two characteristics, i.e. My Acc Ctrl which is a characteristic for access control and All Features which is a characteristic for data communication, regardless of the number of functions. The setting change bitmap of the server is stored as Access Control Bitmap which is an attribute value of My Acc Ctrl. The values of the conventional characteristics (i.e. ServiceN1 to ServiceNx) may be stored as an attribute value of All Features. In the present embodiment, a class which is information for distinguishing a plurality of kinds of data is added to each kind of data because only one handle (0x0011) is assigned to the characteristic value of each of Service N1 to ServiceNx. In other words, a plurality of kinds of data which have been conventionally distinguished by UUIDs or handle values are distinguished by classes which are new identification information. For example, as shown in FIG. 13, the class of respective data is stored in the first one byte of a 20-byte area allocated to store the respective data and the data is stored in the remaining 19 bytes. In this example, 256 kinds of data can be distinguished by classes because one byte is assigned to the class. In preferred embodiments, information on the classes is maintained as the specification so that each communication device can hold the same class information. The size of each of the area in which the data is stored and the area in which the class is stored is not limited to the present embodiment. Further, the position in which the class is stored is not limited to the head of the 20-byte area allocated to store the data.

Figure 14:
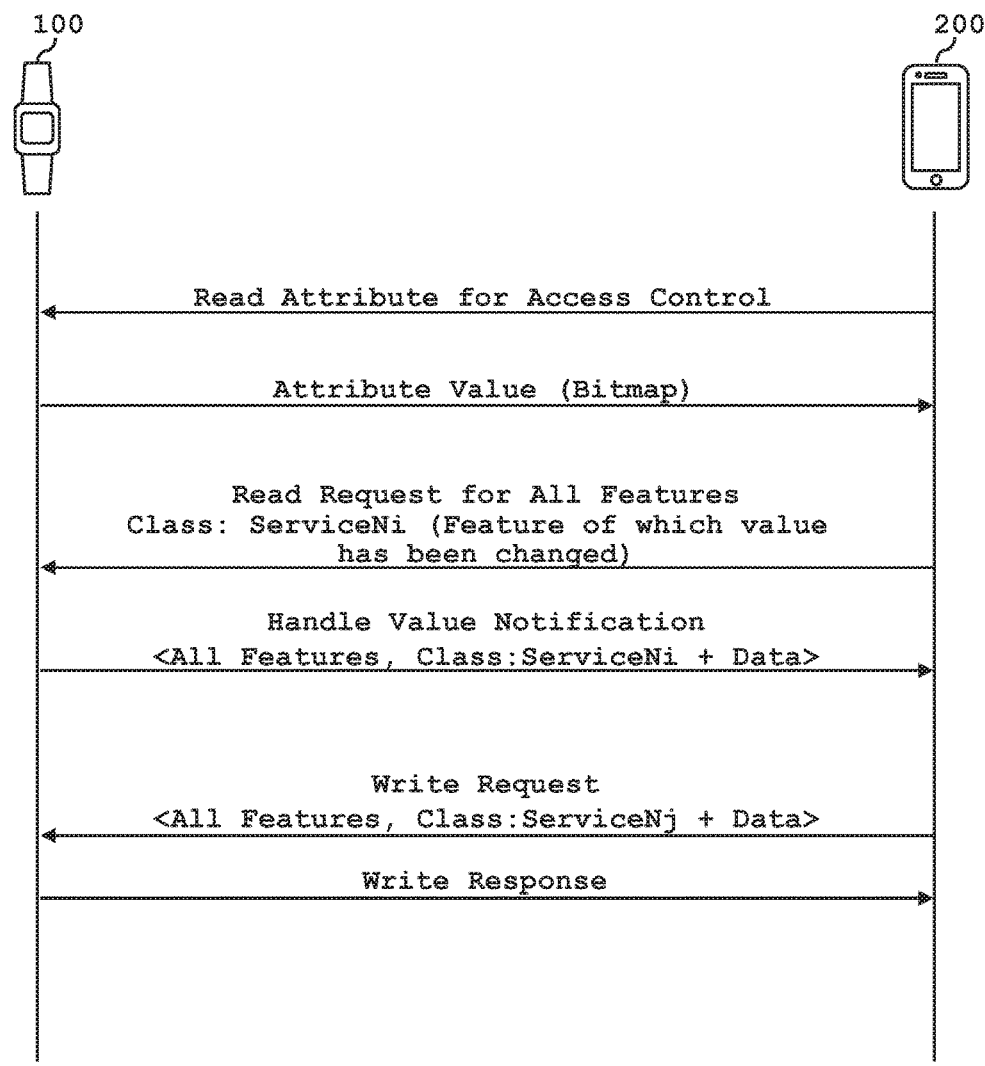
FIG. 14 shows a data communication method between a server and a client in a mode where an always-on connection is available between the server and the client according to an embodiment of the present invention.

FIG. 14 shows a data communication method between a server and a client in a mode where an always-on connection is available between the server and the client according to an embodiment of the present invention. In the present embodiment, the attribute database of FIG. 13 is implemented in the server. The first device 100 operates as the server and the second device 200 operates as the client. At predetermined timing (for example, at a predetermined time or when the user performs a predetermined manipulation), the client transmits a Read Request message with the Attribute Handle parameter set to the handle of an attribute for access control (i.e. 0x000f which is the Characteristic Value Handle of My Acc Ctrl) to the server. The server transmits a Read Response message with the Attribute Value parameter set to Access Control Bitmap to the client in reply to the Read Request message. By this, the client can acquire Access Control Bitmap of the server. As described with respect to FIG. 11, the client also holds the bitmap indicating which data it wants to change.

The client determines a feature of which value has been changed on the server side (in this example, ServiceNi) from Access Control Bitmap and transmits a Read Request message with the Attribute Handle parameter set to 0x0011 which is the Characteristic Value Handle of All Features to the server in order to read out the value of the feature. In the case of receiving the Read Request message, the server transmits a Handle Value Notification with an Attribute Handle parameter and an Attribute Value parameter set to 0x0011 which is the Characteristic Value Handle of All Features and (class of ServiceNi+data), respectively, to the client. Here, the data is the value of the feature that has been changed in the server (i.e. ServiceNi). By this, the client can acquire the changed data on the server side and update the setting on the client side. In the case of determining that no feature's value has been changed on the server side from Access Control Bitmap, the client does not send this Read Request message.

In addition, the client can determine data to be synchronized by performing the logical OR of the acquired setting change bitmap and the bitmap in the client, as described with respect to FIG. 11. For example, in the case that the client wants to change the value of ServiceNj of the setting of the server, it transmits a Write Request message with the Attribute Handle parameter and the Attribute Value parameter to 0x0011 which is the Characteristic Value Handle of All Features and (class of ServiceNj+update data), respectively, to the server. Here, the update data is the value to which the feature (i.e. ServiceNj) is updated. In the case that the update data is written, the server transmits a Write Response message to the client. Instead of the Write Request, a Write Command accompanied by no response message may be used.

In the case that the feature of which value has been changed on the server side and the feature of which value the client wants to change among ServiceN1 to ServiceNx are the same, for example, the bit of which value is 1 of the setting change bitmap of the server and the bit of which value is 1 of the client's bitmap are the same, the feature is processed according to a rule specified in the Specification. For example, according to a rule setting a priority to the server, the server transmits the value of the feature that has been changed on the server side to the client, and the client updates the feature to the received value. In another example, the user is notified that the feature to be updated is the same on the server side and on the client side and prompted to select which one to prioritize.

On the other hand, in the case that the attribute database shown in FIG. 12 is implemented in the server, the parameters of messages exchanged between the client and the server are changed as follows. In order to request the value of the feature that has been changed after the last communication, the client transmits a Read Request message with the Attribute Handle parameter set to the Characteristic Value Handle of Service Ni to the server. In reply to the Read Request message, the server transmits a Handle Value Notification message with the Attribute Handle parameter and the Attribute Value parameter set to the Characteristic Value Handle of Service Ni and the value of Service Ni, respectively, to the client. In the case that the client wants to change the value of ServiceNj of the setting of the server, it transmits a Write Request message with the Attribute Handle parameter and the Attribute Value parameter set to the Characteristic Value Handle of Service Nj and update data of ServiceNj, respectively, to the server.

Figure 15:
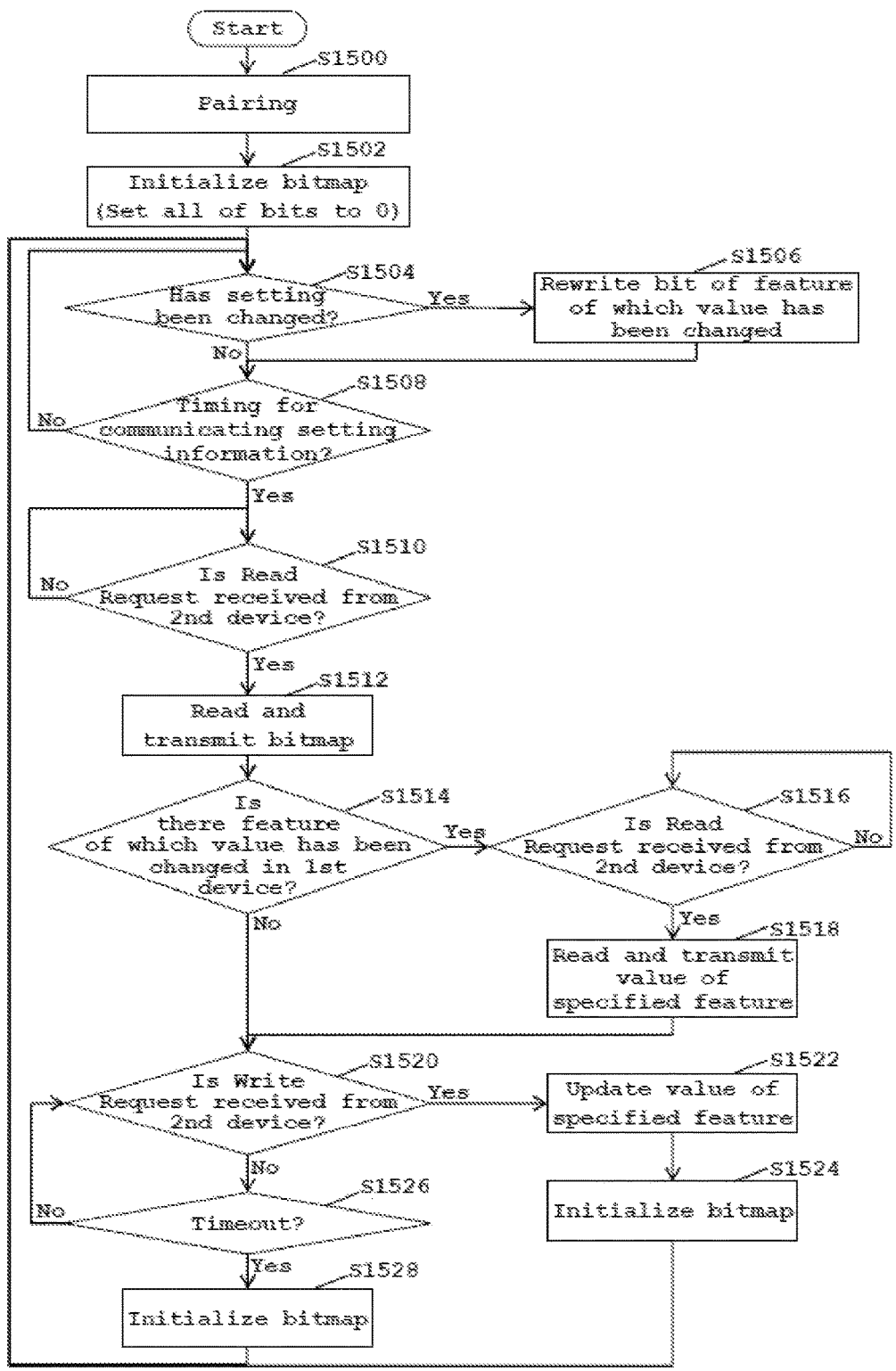
FIG. 15 is a flow chart showing a communication process according to an embodiment of the present invention.

FIG. 15 is a flow chart showing a communication process according to the embodiment shown in FIGS. 13 and 14. As an example, the flowchart of FIG. 15 shows an algorithm for controlling the server in the mode where the always-on connection is available between the server and the client. In the present embodiment, the first device 100 operates as the server and the second device 200 operates as the client. FIG. 15 will be described in detail below with reference to FIG. 2A.

When the communication process starts, paring between the first device 100 and the second device 200 is performed (step S1500). When they are paired, the processor 104 of the first device 100 initializes the setting change bitmap, i.e. Access Control Bitmap of the attribute database (see FIGS. 10 and 13), stored in the memory 108 (Step S1502). By this, all of the bits of Access Control Bitmap are set to zero (0). Then, it is determined whether or not the setting of the first device 100 has been changed (Step S1504). In the case that a predetermined condition is satisfied (for example, a predetermined manipulation is performed by the user) and the setting of the first device 100 has been changed after the last communication, in other words, values of one or more features of ServiceN1 to ServiceNx have been changed (Step S1504: YES), one or more bits corresponding to the one or more features of which values have been changed in Access Control Bitmap are rewritten (Step S1506). That is, each of the one or more bits set to zero (0) is updated to one (1). Then, it is determined whether or not the timing for communicating setting information of the first device 100 with the second device 200 has arrived (Step S1508). On the other hand, in the case that the setting of the first device 100 has not been changed after the last communication (Step S1504: NO), the process proceeds to Step S1508 right away.

In the case that the timing for communicating the setting information of the first device 100 with the second device 200 has arrived (Step S1508: YES), the first device 100 determines whether or not a Read Request message is received from the second device 200 (Step S1510). On the other hand, in the case that the timing for communicating the setting information of the first device 100 with the second device 200 has not arrived (Step S1508: NO), the process returns to Step S1504.

For a predetermined period of time, the first device 100 determines whether or not the Read Request message for requesting the attribute value of My Acc Ctrl stored in the attribute database of the first device 100 is received from the second device 200 (Step S1510: NO). As described with respect to FIGS. 13 and 14, this Read Request message requests the setting change bitmap of the first device 100 which is the server. In the case that the Read Request message is not received within the predetermined period of time, an error message indicating that the setting information cannot be communicated is notified to the user, for example. In the case that the Read Request message is received from the second device 200 within the predetermined period of time (Step S1510: YES), the processor 104 of the first device 100 reads the setting change bitmap stored in the memory 108 and transmits it to the second device 200 (Step S1512).

Then, the processor 104 of the first device 100 determines whether or not there are one or more features of which values have been changed based on the setting change bitmap stored in the memory 108 (Step S1514). In the case that there are one or more features of which values have been changed (Step S1514: YES), the processor 104 of the first device 100 determines whether or not a Read Request message is received from the second device 200 (Step S1516). As described with respect to FIGS. 13 and 14, this Read Request message uses the handle value of All Features which is the characteristic of the first device 100 as its parameter. For a predetermined period of time, the processor 104 of the first device 100 determines whether or not the Read Request message is received from the second device 200 (Step S1516: NO). In the case that the Read Request message is received from the second device 200 within the predetermined period of time (Step S1516: YES), the first device 100 reads only the values of the one or more features specified by the setting change bitmap, i.e. the values of the one or more features corresponding to the one or more bits of the setting change bitmap of which values are one (1), and transmits them to the second device 200 (Step S1518). For example, in the case that the value of ServiceNi has been changed in the first device 100, the first device 100 transmits a Handle Value Notification message in which the value of ServiceNi is stored to the second device 200, as shown in FIG. 14. By this, it is possible to transmit only the setting information that has been changed after the last communication to the second device 200. In the case that the Read Request message is not received within the predetermined period of time, an error message indicating that the setting information cannot be communicated is notified to the user, for example. On the other hand, in the case that there is no feature of which value has been changed in the first device 100 (Step S1514: NO), the process proceeds to Step S1520 right away.

Then, the processor 104 of the first device 100 determines whether or not a Write Request message for requesting write of data is received from the second device 200 (Step S1520). For example, in the case that the value of ServiceNj has been changed in the second device 200, the second device 200 transmits a Write Request message using the handle value of All Features and (class of ServiceNj+update data) as its parameters to the first device 100, as shown in FIG. 14. Here, the update data is the changed value of ServiceNj. In the case that the Write Request message is received from the second device 200 within a predetermined period of time (Step S1520: YES), the processor 104 of the first device 100 updates the value of the feature specified by the Write Request message (Step S1522). For example, the value of ServiceNj corresponding to the class contained in the Write Request message is updated to the update data contained in the Write Request message, as shown in FIG. 14. Then, the setting change bitmap is initialized and the process returns to Step S1504 (Step S1524).

In the case that the Write Request message is not received from the second device 200 (Step S1520: NO), the processor 104 of the first device 100 determines whether or not the predetermined period of time has elapsed (Step S1526). In the case that the predetermined period of time has not elapsed (Step S1526: NO), the process returns to S1520. On the other hand, in the case that the predetermined period of time has elapsed, i.e. a timeout occurs (Step S1526: YES), the processor 104 of the first device 100 determines that the second device 200 does not request change of any setting information and initializes the setting change bitmap, and the process return to Step S1504 (Step S1528).

Figure 16:
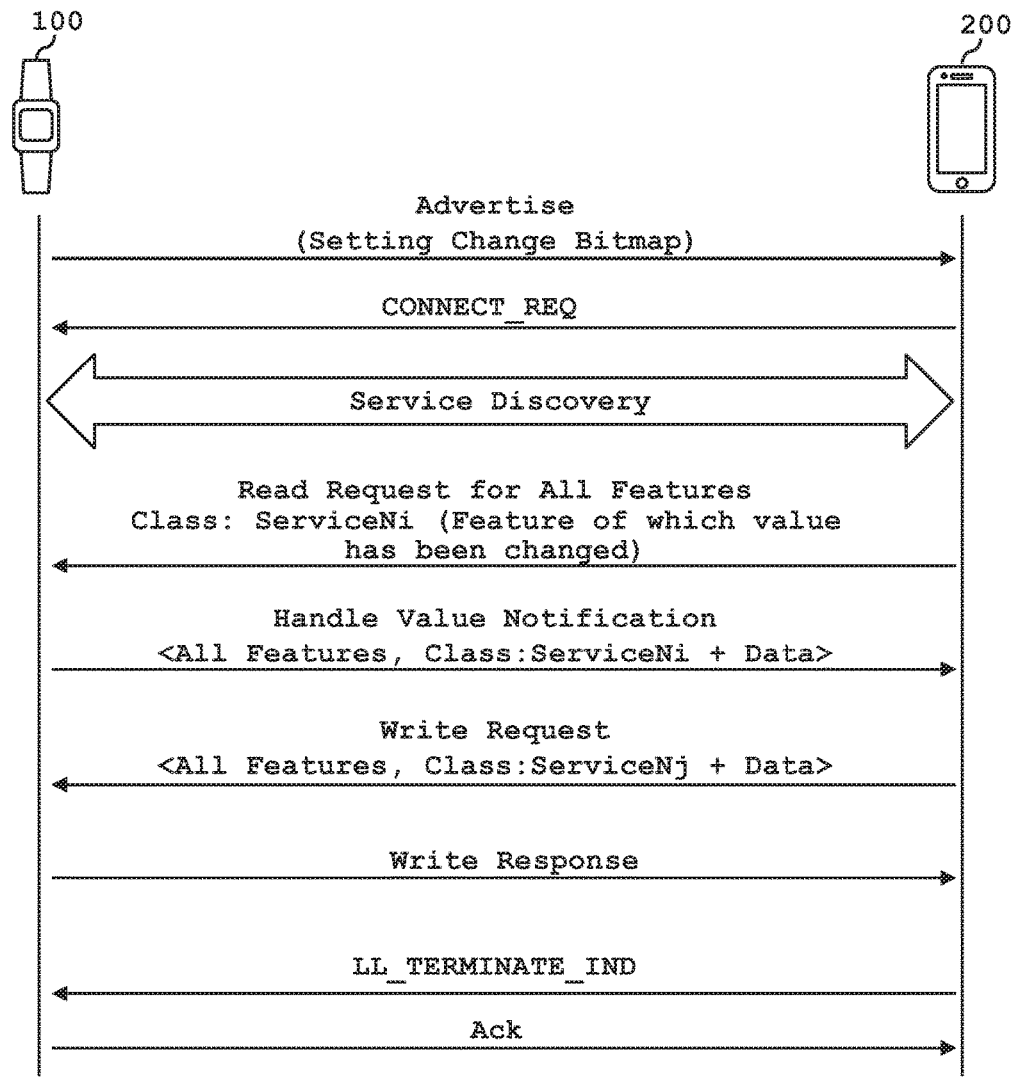
FIG. 16 shows a data communication method between a server and a client in a mode where the server and the client disconnect/reconnect according to an embodiment of the present invention.

FIG. 16 shows a data communication method between a server and a client in a mode where the server and the client disconnect/reconnect according to another embodiment of the present invention. In the present embodiment, the attribute database of FIG. 13 is implemented in the server. The first device 100 operates as the server and the second device 200 operates as the client. At predetermined timing (for example, at a predetermined time or when the user performs a predetermined manipulation), the first device 100 which is the server sends an advertising packet. In the advertising packet, the setting change bitmap indicating one or more features of which values have been changed in the server after the last communication is stored. According to the present embodiment, the setting change bitmap of the server is transmitted to the client at the advertising stage before a connection between the server and the client is established. By receiving the advertising packet, the second device 200 can acquire the setting change bitmap of the server. Similarly to the above described embodiments, it is desirable to arrange corresponding bits of bitmaps in the server and the client in a common order. Thus, the second device 200 can determine the feature of which value has been changed in the first device 100 based on the acquired bitmap.

After receiving the advertising packet, the second device 200 transmits a Connection Request to the first device 100. If the first device 100 receives the Connection Request, a connection between the first and second devices is established. The Connection Request is a packet transmitted by a master device to a slave device in order to create an L2CAP channel between the two devices. Next, the service discovery is performed. In this service discovery session, the second device 200 which is the client acquires information on the service and the characteristics implemented in the first device 100 (see FIG. 13).

After the service discovery ends, the second device 200 which is the client determines the feature of which value has been changed in the server (in this example, ServiceNi) based on the setting change bitmap and transmits a Read Request message to the server in order to read out the value of the feature. Since a procedure of data exchange in the embodiment shown in FIG. 16 is similar to that of the embodiment shown in FIG. 14, detailed descriptions thereof will be omitted. In the case of receiving the Read Request message, the server transmits a Handle Value Notification message containing the value of Service Ni as data to the client.

In the case that the client attempts to change the value of ServiceNj in the server, it transmits a Write Request message containing update data of ServiceNj to the server. In the case that the update data is written to ServiceNj, the server transmits a Write Response message to the client.

If exchange of necessary data is completed, the second device 200 transmits a message for initiating disconnection of the connection (LL_TERMINATE_IND) to the first device 100, for example. If the second device 200 receives an acknowledgement message (Ack) from the first device 100, the connection is disconnected. In the case that the setting does not change in both of the first device 100 and the second device 200 (that is, the values of all of the bits of the bitmaps of both devices are zero (0)), there is no data to exchange. So, immediately after the connection between the devices is established, the connection is disconnected.

Figure 17:
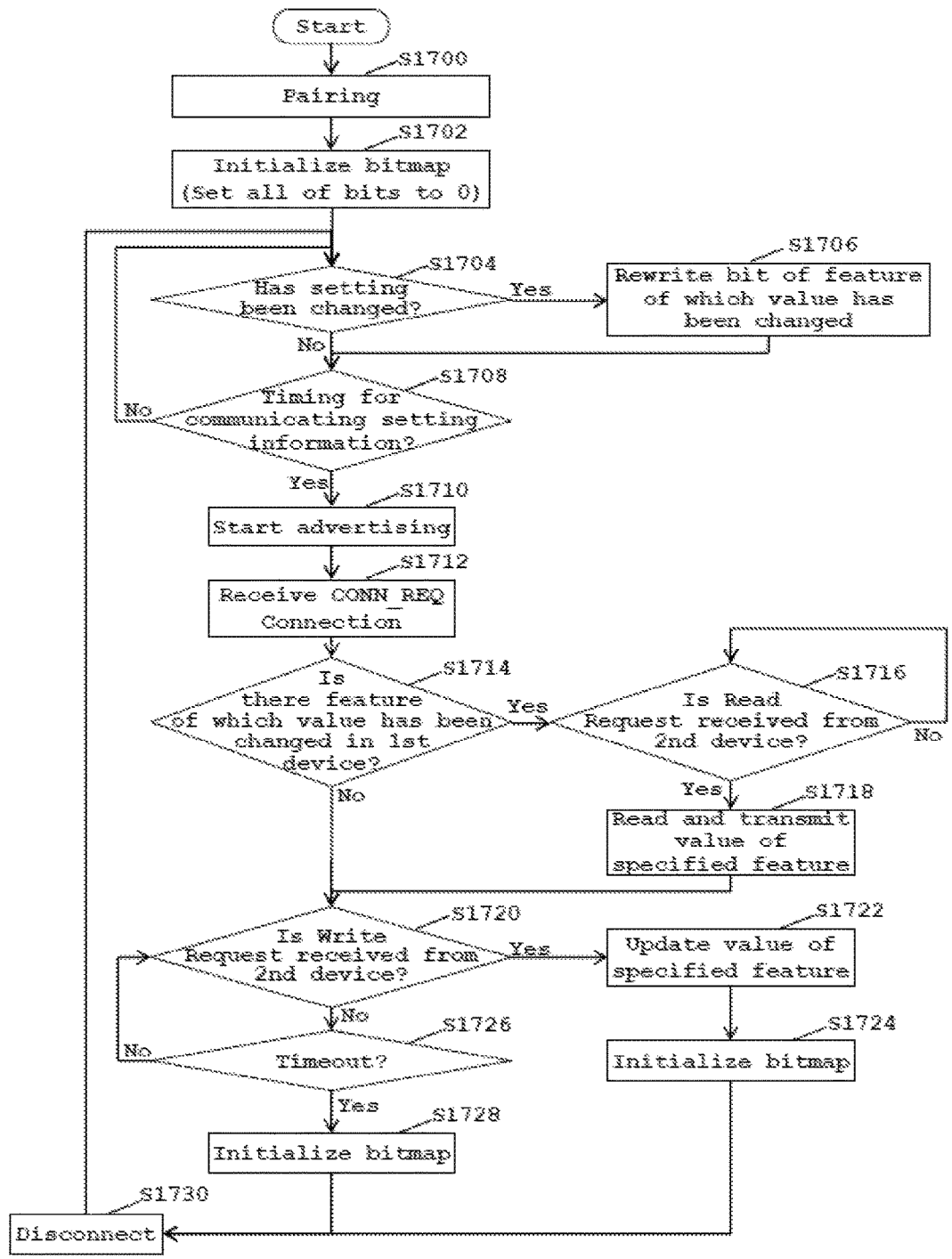
FIG. 17 is a flow chart showing a communication process according to an embodiment of the present invention.

FIG. 17 is a flow chart showing a communication process according to the embodiment shown in FIGS. 13 and 16. As an example, the flowchart of FIG. 17 shows an algorithm for controlling the server in the mode where the server and the client disconnect/reconnect. In the present embodiment, the first device 100 operates as the server and the second device 200 operates as the client. FIG. 17 will be described in detail below with reference to FIG. 2A. In the present embodiment, since the setting change bitmap is transmitted to the client by the advertising packet when reconnection occurs, My Acc Ctrl which is the characteristic for access control and its attributes of the attribute database of FIG. 13 are not used. Thus, in the case that the server operates only in the mode where reconnection occurs, the characteristic My Acc Ctrl does not need to be implemented in the server. In this case, the attribute database of the server may contain only one characteristic All Features.

When the communication process starts, paring between the first device 100 and the second device 200 is performed (step S1700). When they are paired, the processor 104 of the first device 100 initializes the setting change bitmap stored in the memory 108 (Step S1702). By this, all of the bits of the setting change bitmap are set to zero (0). Then, it is determined whether or not the setting of the first device 100 has been changed (Step S1704). In the case that a predetermined condition is satisfied (for example, a predetermined manipulation is performed by the user) and the setting of the first device 100 has been changed after the last communication, in other words, values of one or more features of ServiceN1 to ServiceNx have been changed (Step S1704: YES), one or more bits corresponding to the one or more features of which values have been changed in the setting change bitmap are rewritten (Step S1706). That is, each of the one or more bits set to zero (0) is updated to one (1). Then, it is determined whether or not the timing for communicating the setting information of the first device 100 with the second device 200 has arrived (Step S1708). On the other hand, in the case that the setting of the first device 100 has not been changed after the last communication (Step S1704: NO), the process proceeds to Step S1708 right away.

In the case that the timing for communicating the setting information of the first device 100 with the second device 200 has arrived (Step S1708: YES), the first device 100 starts advertising (Step S1710). As described with respect to FIG. 16, the first device 100 sends an advertising packet in which the setting change bitmap is stored to the second device 200. If the first device 100 receives the Connection Request from the second device 200, a connection between the first and second devices is established (Step S1712). On the other hand, in the case that the timing for communicating the setting information of the first device 100 with the second device 200 has not arrived (Step S1708: NO), the process returns to Step S1704.

Then, the processor 104 of the first device 100 determines whether or not there are one or more features of which values have been changed based on the setting change bitmap stored in the memory 108 (Step S1714). In the case that there are one or more features of which values have been changed (Step S1714: YES), the processor 104 of the first device 100 determines whether or not a Read Request message is received from the second device 200 (Step S1716). As described with respect to FIGS. 13 and 16, this Read Request message uses the handle value of All Features which is the characteristic of the first device 100 as its parameter. For a predetermined period of time, the processor 104 of the first device 100 determines whether or not the Read Request message is received from the second device 200 (Step S1716: NO). In the case that the Read Request message is received from the second device 200 within the predetermined period of time (Step S1716: YES), the first device 100 reads only the values of the one or more features specified by the setting change bitmap, i.e. the values of the one or more features corresponding to the one or more bits of the setting change bitmap of which values are one (1), and transmits them to the second device 200 (Step S1718). For example, in the case that the value of ServiceNi has been changed in the first device 100, the first device 100 transmits a Handle Value Notification message in which the value of ServiceNi is stored to the second device 200, as shown in FIG. 16. By this, it is possible to transmit only the setting information that has been changed after the last communication to the second device 200. In the case that the Read Request message is not received within the predetermined period of time, an error message indicating that the setting information cannot be communicated is notified to the user, for example. On the other hand, in the case that there is no feature of which value has been changed in the first device 100 (Step S1714: NO), the process proceeds to Step S1720 right away.

Then, the processor 104 of the first device 100 determines whether or not a Write Request message for requesting write of data is received from the second device 200 (Step S1720). For example, in the case that the value of ServiceNj has been changed in the second device 200, the second device 200 transmits a Write Request message using the handle value of All Features and (class of ServiceNj+update data) as its parameters to the first device 100, as shown in FIG. 16. Here, the update data is the changed value of ServiceNj. In the case that the Write Request message is received from the second device 200 within a predetermined period of time (Step S1720: YES), the processor 104 of the first device 100 updates the value of the feature specified by the Write Request message (Step S1722). For example, the value of ServiceNj corresponding to the class contained in the Write Request message is updated to the update data contained in the Write Request message, as shown in FIG. 16. Then, the setting change bitmap is initialized (Step S1724) and a disconnection procedure is performed (Step S1730). As described above, the disconnection procedure is initiated by receiving LL_TERMINATE_IND from the second device 200, for example. After the connection between the first and second devices is disconnected, the process returns to S1704.

In the case that the Write Request message is not received from the second device 200 (Step S1720: NO), the processor 104 of the first device 100 determines whether or not the predetermined period of time has elapsed (Step S1726). In the case that the predetermined period of time has not elapsed (Step S1726: NO), the process returns to S1720. On the other hand, in the case that the predetermined period of time has elapsed, i.e. a timeout occurs (Step S1726: YES), the processor 104 of the first device 100 determines that the second device 200 does not request change of any setting information, initializes the setting change bitmap (Step S1728), and performs the disconnection procedure (Step S1730). After the connection between the first and second devices is disconnected, the process returns to S1704.

Figure 18:
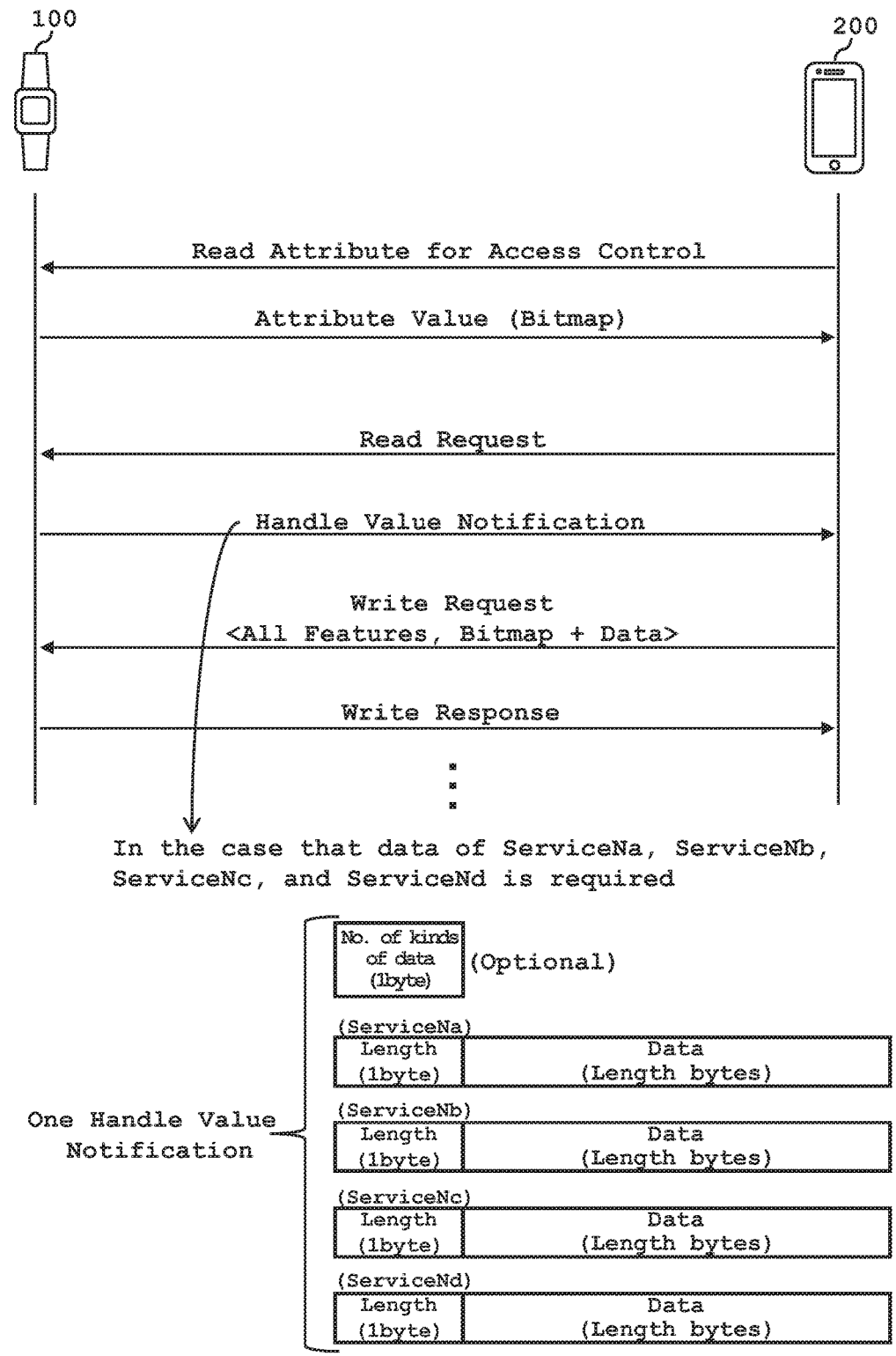
FIG. 18 shows a data communication method between a server and a client according to an embodiment of the present application.

FIG. 18 shows a data communication method between a server and a client according to another embodiment of the present application. Although FIG. 18 is described in connection with the mode where the always-on connection is available between the server and the client, the idea of the present embodiment can also be applied to the mode where the server and the client disconnect/reconnect. In the present embodiment, the attribute database of FIG. 13 is implemented in the server. The first device 100 operates as the server and the second device 200 operates as the client. In the embodiments described above, one Handle Value Notification message or one Write Request message transfers only one feature value. Thus, in the case that the values of a plurality of features have been changed in the server, the server sends Handle Value Notification messages of the number of the features of which values have been changed. In the case that the client wants to change the values of a plurality of features, the client sends Write Request messages of the number of the features and the server sends Write Response messages of the number of the features in reply to the Write Request messages. In contrast, the present embodiment is configured to use one message for a plurality of features in order to further reduce the number of communications.

At predetermined timing (for example, at a predetermined time or when the user performs a predetermined manipulation), the client transmits a Read Request message with the Attribute Handle parameter set to the handle of the attribute for access control (i.e. 0x000f which is the Characteristic Value Handle of My Acc Ctrl) to the server. The server transmits a Read Response message with the Attribute Value parameter set to Access Control Bitmap to the client in reply to the Read Request message. By this, the client can acquire the setting change bitmap of the server. As described above, the client also holds the bitmap indicating which data it wants to change. On the other hand, in the mode where the server and the client disconnect/reconnect, the server may send an advertising packet in which the setting change bitmap is stored to the client. Thus, the client can acquire the setting change bitmap of the server.

In the case that the client determines that there are one or more features of which values have been changed based on the setting change bitmap received from the server, it transmits a Read Request message with the Attribute Handle parameter set to the Characteristic Value Handle of All Features to the server. In the case of receiving the Read Request message from the client, the server transmits the changed values of the one or more features to the client. For example, in the case that the features of which values have been changed are ServiceNa, ServiceNb, ServiceNc, and ServiceNd, the server transmits one Handle Value Notification message with the Attribute Handle parameter set to 0x0011, which is the Characteristic Value Handle of All Features, and the Attribute Value parameter set to the number of kinds of data to be transmitted (in this example, four (4)) and the length of data of each of ServiceNa, ServiceNb, ServiceNc, and ServiceNd (a one-byte Length field) and the data ((the value of the Length field) bytes), as shown in FIG. 18, to the client. Preferably, the order of array of the plurality of kinds of data stored in the message (i.e. data of ServiceNa, data of ServiceNb, data of ServiceNc, and data of ServiceNd) matches the order of array of the bits of the setting change bitmap. More preferably, the order of the plurality of kinds of data stored in the message (i.e. data of ServiceNa, data of ServiceNb, data of ServiceNc, and data of ServiceNd) is the same as the order of the corresponding bits of the setting change bitmap, and the length of the data of each feature is added ahead of the data. By this, the client can distinguish the plurality of kinds of data. The number of the data to be transmitted is optional information and may not be contained in the message.

In the case that the client wants to change the values of one or more features, it transmits a Write Request message with the Attribute Handle parameter and the Attribute Value parameter set to 0x0011 which is the Characteristic Value Handle of All Features and (the client's bitmap+update data), respectively, to the server. In the case that there are a plurality of kinds of data to be changed, (the length of each kind of data+the data) is stored in a data field of the message in the same order as the bitmap, similarly to the Handle Value Notification message. The server can determine the features of which values the client requests the server to change based on the client's bitmap. In the case that the data is written successfully, the server transmits a Write Response message to the client.

Figure 19:
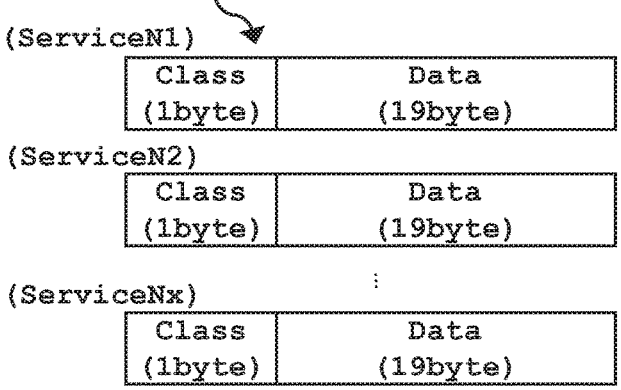
FIG. 19 shows an example of an attribute database according to another embodiment of the present invention.

FIG. 19 shows an example of an attribute database according to another embodiment of the present invention. The attribute database of the present embodiment further includes Read Request for All Features, which is a characteristic for data request, compared to the attribute database of FIG. 13. Since the remaining parts of the attribute database of FIG. 19 are the same as the attribute database of FIG. 13, they will not be described in detail herein. In the following, data communication between a server in which the attribute database of FIG. 19 is implemented and a client will be described with reference to each of FIGS. 20 and 21. In both of FIGS. 20 and 21, the first device 100 operates as the server and the second device 200 operates as the client.

Figure 20:
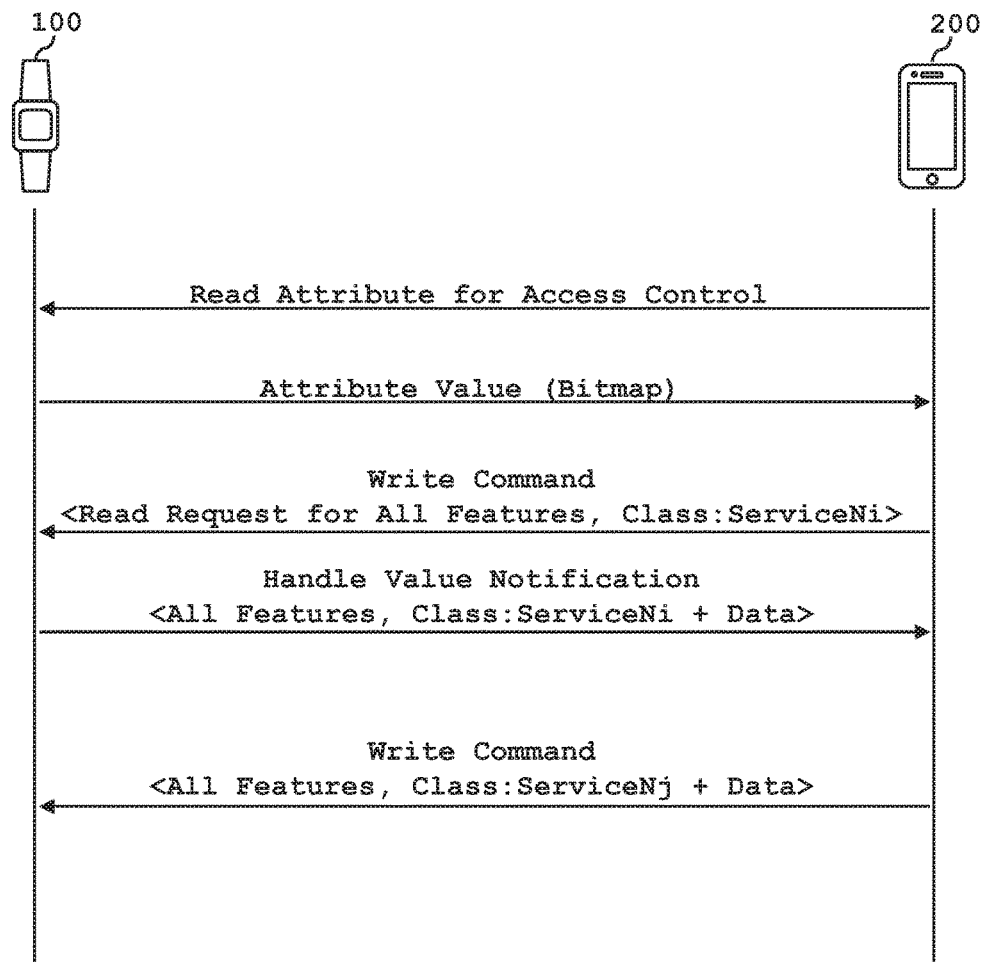
FIG. 20 shows a data communication method between a server and a client in a mode where an always-on connection is available between the server and the client according to an embodiment of the present invention.

FIG. 20 shows a data communication method between the server and the client in the mode where the always-on connection is available between the server and the client according to an embodiment of the present invention. At predetermined timing (for example, at a predetermined time or when the user performs a predetermined manipulation), the client transmits a Read Request message with the Attribute Handle parameter set to the handle of the attribute for access control (i.e. 0x000f which is the Characteristic Value Handle of My Acc Ctrl) to the server. The server transmits a Read Response message with the Attribute Value parameter set to Access Control Bitmap to the client in reply to the Read Request message. By this, the client can acquire Access Control Bitmap of the server. As described with respect to FIG. 11, the client also holds the bitmap indicating which data it wants to change.

The client determines a feature of which value has been changed on the server side (in this example, ServiceNi) from Access Control Bitmap and transmits a Write command message with an Attribute Handle parameter and an Attribute Value parameter set to 0x0011 which is the Characteristic Value Handle of the characteristic Read Request for All Features and the class of ServiceNi, respectively, to the server in order to read out the value of the feature. In the case of receiving the Write Command message, the server transmits a Handle Value Notification with the Attribute Handle parameter and the Attribute Value parameter set to 0x0013 which is the Characteristic Value Handle of All Features and (class of ServiceNi+data), respectively, to the client. Here, the data is the value of the feature that has been changed in the server (i.e. ServiceNi). By this, the client can acquire the changed data on the server side. In the case of determining that no feature's value has been changed on the server side from Access Control Bitmap, the client does not send the Write Command message.

As described with respect to FIG. 11, the client can determine data to be synchronized by performing the logical OR of the acquired setting change bitmap and the bitmap in the client. For example, in the case that the client wants to change the value of ServiceNj of the setting of the server, it transmits a Write Command message with the Attribute Handle parameter and the Attribute Value parameter to 0x0013 which is the Characteristic Value Handle of All Features and (class of ServiceNj+update data), respectively, to the server. Here, the update data is the value to which the feature (i.e. ServiceNj) is updated. The client may use a Write Request message accompanied by a response message instead of the Write Command message. In this case, if the update data is written, the server transmits a Write Response message to the client.

Figure 21:
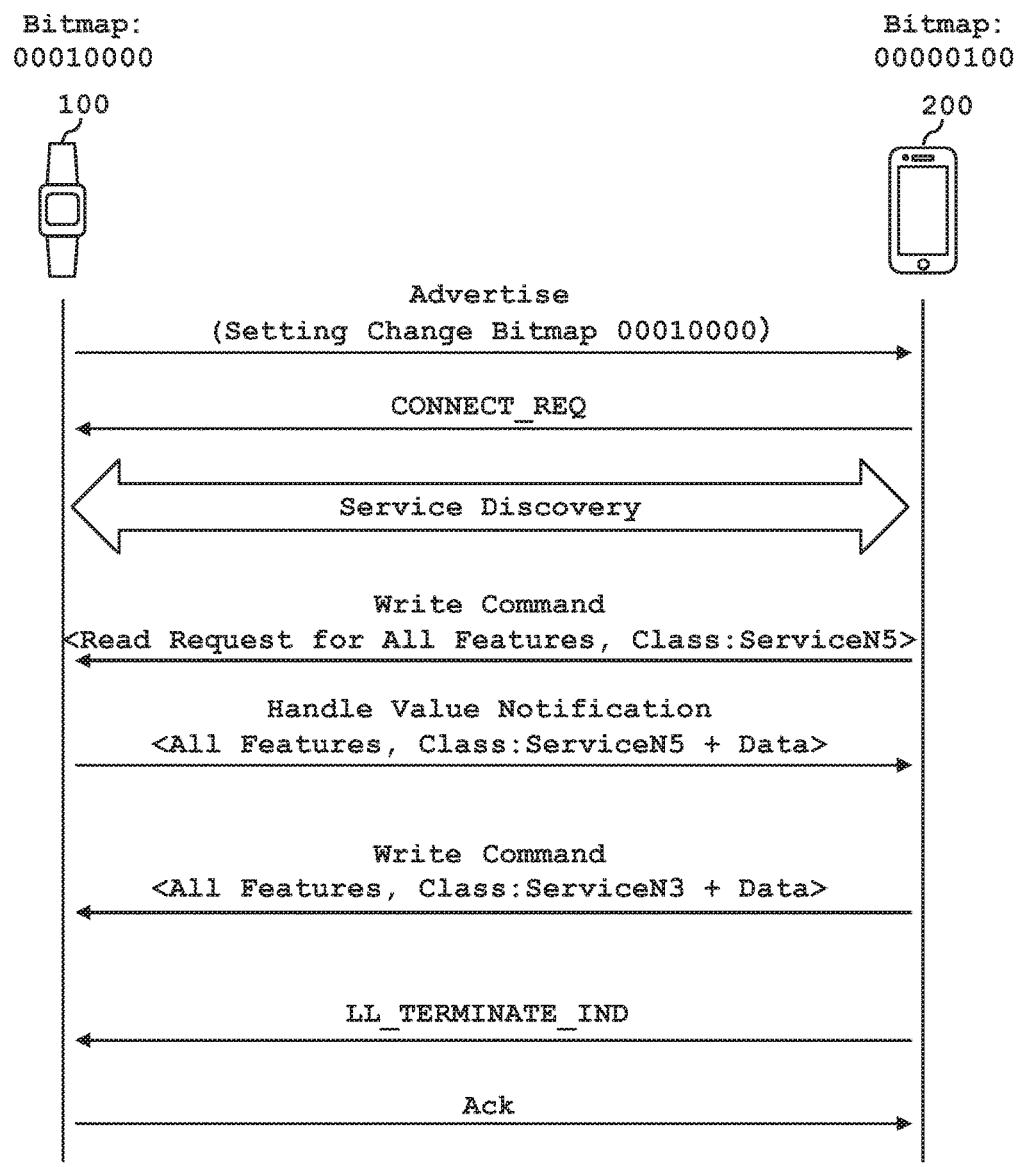
FIG. 21 shows a data communication method between a server and a client in a mode where the server and the client disconnect/reconnect according to an embodiment of the present invention.

FIG. 21 shows a data communication method between the server and the client in the mode where the server and the client disconnect/reconnect according to an embodiment of the present invention. At predetermined timing (for example, at a predetermined time or when the user performs a predetermined manipulation), the first device 100 which is the server sends an advertising packet. In the advertising packet, the setting change bitmap indicating one or more features of which values have been changed in the server after the last communication is stored. According to the present embodiment, the setting change bitmap of the server is transmitted to the client at the advertising stage before a connection between the server and the client is established. By receiving the advertising packet, the second device 200 can acquire the setting change bitmap of the server. In the example shown in FIG. 21, the setting change bitmap of the server is 00010000. In other words, the value of the fifth feature has been changed on the server side after the last communication. As described above, it is desirable to arrange corresponding bits of bitmaps in the server and the client in a common order. Thus, the second device 200 can determine the feature of which value has been changed in the first device 100 based on the acquired bitmap. In addition, the client also holds the bitmap indicating which data it wants to change, as described with respect to FIG. 11. In the example shown in FIG. 21, the bitmap of the client is 00000100. In other words, the value of the third feature has been changed on the client side after the last communication.

After receiving the advertising packet, the second device 200 transmits a Connection Request to the first device 100. If the first device 100 receives the Connection Request, a connection between the first and second devices is established. Next, the service discovery is performed. In this service discovery session, the second device 200 which is the client acquires information on the service and the characteristics implemented in the first device 100 (see FIG. 19).

After the service discovery ends, the second device 200 which is the client determines the feature of which value has been changed in the server (in this example, ServiceN5) based on the setting change bitmap and transmits a Write Command message with the Attribute Handle parameter and the Attribute Value parameter set to 0x0011 which is the Characteristic Value Handle of Read Request for All Features and the class of ServiceN5, respectively, to the server in order to read out the value of the feature. In the case of receiving the Write Command message, the server transmits a Handle Value Notification message with the Attribute Handle parameter and the Attribute Value parameter set to 0x0013 of the Characteristic Value Handle of All Features and (class of ServiceN5+data), respectively, to the client. Here, the data is the value of ServiceN5. Thus, the client can acquire the data changed in the server. In the case of determining that no feature's value has been changed on the server side based on the setting change bitmap, the client does not send this Write Command message.

In addition, the client can determine data to be synchronized by performing the logical OR of the acquired setting change bitmap and the bitmap in the client, as described with respect to FIG. 11. Since it is required to change setting of ServiceN3 in the server in the example shown in FIG. 21, the client transmits a Write Command message with the Attribute Handle parameter and the Attribute Value parameter to 0x0013 which is the Characteristic Value Handle of All Features and (class of ServiceN3+update data), respectively, to the server. Here, the update data is the value to which the feature (i.e. ServiceN3) is updated. Instead of the Write Command, a Write Request message accompanied by a response message may be used. In this case, if the value of ServiceN3 is updated to the update data, the server transmits a Write Response message to the client.

If exchange of necessary data is completed, the second device 200 transmits a message for initiating disconnection of the connection (LL_TERMINATE_IND) to the first device 100, for example. If the second device 200 receives an acknowledgement message (Ack) from the first device 100, the connection is disconnected. In the case that the setting does not change in both of the first device 100 and the second device 200 (that is, the values of all of the bits of the bitmaps of both devices are zero (0)), there is no data to exchange. So, immediately after the connection between the devices is established, the connection is disconnected.

In the above embodiments, the Handle Value parameter of the Write Command message for requesting to the server for the setting information is set to the class of the feature of which value has been changed. In other embodiments, the Handle Value parameter of the Write Command message is set to the setting change bitmap. According to the embodiments using the setting change bitmap as the parameter, the amount of communication data can be reduced compared to the embodiments using the class. For example, in the case that there is one feature in the server, the amount of communication data can be reduced to ⅛ compared to the embodiments using the class having the size of one byte because the bitmap of the server has the size of one bit.

Therefore, in the case of using the bitmap as the parameter, the amount of communication data can be reduced up to about ⅛ according to the number of features, compared to the embodiments using the class.

In each of the embodiments described above, the Write Command message may be replaced with a Write Request message and the Handle Value Notification message may be replaced with a Handle Value Indication message. The type of message can be determined according to the importance of data to be transmitted, the capacity of the battery of the terminal for receiving the message, and the like.

In many embodiments described above, the server transmits the setting information that has been changed after the last communication to the client if a request message (for example, the Read Request message for All Features of FIG. 14, and the Write Command message for Read Request for All Features of FIG. 20) is received from the client. The present invention is not limited to these embodiments. In another embodiment, the client does not transmit a message for requesting the setting information to the server, and, at predetermined timing, the server transmits a Notification or Indication message in which the setting information that has been changed after the last communication is stored to the client.

According to the embodiment shown in FIG. 13 or FIG. 19, the values of all the features are managed using the integrated characteristic All Features. Thus, the time required for the service discovery can be shortened, thereby reducing connection time. Further, even if a new feature is added, there is no need to add a service or a characteristic. The user can add a feature which is included in the current version of the specification to a server device by adding a class and attributes corresponding to the feature. In this case, the convenience of the user can be enhanced if the firmware of the device is designed such that a class can be automatically assigned according to the feature when the user is programming to add the feature. Further, the firmware may be designed such that the user can add a new feature (i.e. generate a new class) which is not included in the current version of the specification. Preferably, the newly generated class has a unique value different from that of a class of a different feature. In addition, the user may add a feature (or a class) by using the website managed by the standard group. The specification to which the new feature (class) has been added can be applied to the communication devices by update of the firmware, or the like.

The present invention has been described with respect to specific embodiments in which it has been applied to Bluetooth, in particular BLE, but its application field is not limited to Bluetooth. For example, the invention can be applied to different wireless communication technologies. In particular, the present invention is applicable to wireless communication technologies which utilize the concept of service discovery.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. These modifications and embodiments fall within the scope and the spirit of the invention described in this specification and within the scope of the invention as defined in the appended claims and equivalents thereof.

What is claimed is:

1. A device capable of wireless communication comprising:
   a communicator configured to transmit and receive communication packets to and from other device;
   a memory configured to store one or more kinds of setting information; and
   a processor configured to determine whether or not at least one of the one or more kinds of setting information has been changed after the last communication with the other device, generate discrimination information indicating whether or not each of the one or more kinds of setting information has been changed, and control communication with the other device based on the discrimination information, wherein the discrimination information is a bitmap, and a number of bits of the bitmap is the same as the number of the kinds of the setting information and wherein each bit of the bitmap is set to one in the case that one kind of setting information corresponding to the bit has been changed after the last communication with the other device, and set to zero in the case that the one kind of setting information has not been changed after the last communication with the other device.

2. The device of claim 1, wherein each bit of the bitmap indicates whether or not one kind of setting information corresponding to the bit has been changed after the last communication with the other device.

3. The device of claim 1, wherein the processor is further configured to control the communicator to transmit the discrimination information to the other device at predetermined timing.

4. The device of claim 3, wherein the processor is configured to control the communicator to transmit the discrimination information to the other device in the case that a message for requesting the discrimination information is received from the other device.

5. The device of claim 3, wherein the discrimination information is stored in an advertising packet transmitted to the other device.

6. The device of claim 1, wherein the processor is further configured to control the communicator to transmit the at least one kind of setting information that has been changed to the other device.

7. The device of claim 1, wherein the processor is further configured to control the communicator to transmit the at least one kind of setting information that has been changed to the other device in the case that a message for requesting the setting information is received from the other device via the communicator.

8. The device of claim 1, wherein the processor is further configured to generate update information including the at least one kind of setting information that has been changed based on the discrimination information, and control the communicator to transmit the update information to the other device at predetermined timing.

9. The device of claim 1, wherein, in the case that a plurality of kinds of setting information have been changed after the last communication with the other device, the processor is further configured to generate update information including the plurality of kinds of setting information that have been changed, and the order of array of the plurality of kinds of setting information included in the update information matches the order of array of the bits of the bitmap.

10. The device of claim 1, wherein, in the case that an update value of at least one of the one or more kinds of setting information is received from the other device via the communicator, the processor is further configured to update the value of the at least one kind of setting information stored in the memory to the update value.

11. An electronic timepiece comprising:
    a device of claim 1; and
    a counter configured to count current time.

12. A device capable of wireless communication comprising:
    a communicator configured to receive service information from other device, and transmit and receive communication packets to and from the other device;
    a memory configured to store one or more kinds of setting information; and
    a processor configured to receive discrimination information indicating whether or not each of the one or more kinds of setting information is to be updated from the other device, and control communication with the other device based on the discrimination information, wherein the discrimination information is a first bitmap having bits of the number of the kinds of the setting information, and the processor is further configured to generate a second bitmap indicating whether or not each of the one or more kinds of setting information has been changed after the last communication with the other device and synchronize the one or more kinds of setting information with setting information of the other device based on the first bitmap and the second bitmap.

13. The device of claim 12, wherein the discrimination information is a bitmap, and the number of bits of the bitmap is the same as the number of the kinds of the setting information.

14. A communication method performed by a device capable of wireless communication comprising:
    paring with other device;
    determining whether or not at least one of one or more kinds of setting information has been changed after the last communication with the other device;
    generating discrimination information indicating whether or not each of the one or more kinds of setting information has been changed; and
    controlling communication with the other device based on the discrimination information, wherein the discrimination information is a bitmap, and the number of bits of the bitmap is the same as the number of the kinds of the setting information and wherein each bit of the bitmap is set to one in the case that one kind of setting information corresponding to the bit has been changed after the last communication with the other device, and set to zero in the case that the one kind of setting information has not been changed after the last communication with the other device.

15. A communication method performed by a device capable of wireless communication comprising:
    paring with other device;
    receiving discrimination information indicating whether or not each of one or more kinds of setting information is to be updated from the other device; and
    controlling communication with the other device based on the discrimination information, wherein the discrimination information is a first bitmap having bits of the number of the kinds of the setting information, and the processor is further configured to generate a second bitmap indicating whether or not each of the one or more kinds of setting information has been changed after the last communication with the other device and synchronize the one or more kinds of setting information with setting information of the other device based on the first bitmap and the second bitmap.

16. A non-transitory computer-readable recording medium for recording a computer program comprising a sequence of instructions which, when executed by a computer included in a device capable of wireless communication, cause the device to perform steps of:
paring with other device;
determining whether or not at least one of one or more kinds of setting information has been changed after the last communication with the other device;
generating discrimination information indicating whether or not each of the one or more kinds of setting information has been changed; and
controlling communication with the other device based on the discrimination information, wherein the discrimination information is a bitmap, and the number of bits of the bitmap is the same as the number of the kinds of the setting information and wherein each bit of the bitmap is set to one in the case that one kind of setting information corresponding to the bit has been changed after the last communication with the other device, and set to zero in the case that the one kind of setting information has not been changed after the last communication with the other device.

17. A non-transitory computer-readable recording medium for recording a computer program comprising a sequence of instructions which, when executed by a computer included in a device capable of wireless communication, cause the device to perform steps of:
paring with other device;
receiving discrimination information indicating whether or not each of one or more kinds of setting information is to be updated from the other device; and
controlling communication with the other device based on the discrimination information, wherein the discrimination information is a first bitmap having bits of the number of the kinds of the setting information, and the processor is further configured to generate a second bitmap indicating whether or not each of the one or more kinds of setting information has been changed after the last communication with the other device and synchronize the one or more kinds of setting information with setting information of the other device based on the first bitmap and the second bitmap.

* * * * *